United States Patent
Gaule et al.

(10) Patent No.: US 11,670,973 B2
(45) Date of Patent: *Jun. 6, 2023

(54) CHARGING SYSTEM INCLUDING ORIENTATION CONTROL

(71) Applicant: Microsoft Technology Licensing, LLC, Redmond, WA (US)

(72) Inventors: Patrick Thomas Gaule, Bothell, WA (US); Jazmine Ama Hoyle, Kirkland, WA (US); Yauhen Radzikevich, Seattle, WA (US); Anthony James Hewett, Duvall, WA (US); Scott Jeffrey Korn, Seattle, WA (US); Ketan R. Shah, Redmond, WA (US); Katherine Margaret Bailey, Seattle, WA (US); Woo Ram Lee, Kirkland, WA (US); Wenzhao Zhang, Shenzhen (CN); Nicolas Jean-Claude Schmitt, Hong Kong (CN); Ibrahim Iskender Kushan, Seattle, WA (US); Jay Michael Fassett, Edmonds, WA (US); James Alec Ishihara, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,433

(22) Filed: Jan. 31, 2022

(65) Prior Publication Data

US 2022/0158506 A1    May 19, 2022

Related U.S. Application Data

(63) Continuation of application No. 16/830,259, filed on Mar. 25, 2020, now Pat. No. 11,239,710.

(Continued)

(51) Int. Cl.
*H01M 10/46*   (2006.01)
*H02J 50/90*   (2016.01)
(Continued)

(52) U.S. Cl.
CPC .......... *H02J 50/90* (2016.02); *G06F 3/03545* (2013.01); *H02J 7/0044* (2013.01);
(Continued)

(58) Field of Classification Search
CPC .......... H02J 7/02; H02J 7/0047; H02J 7/0042; H02J 7/0044; H02J 50/005; H02J 50/90;
(Continued)

(56) References Cited

U.S. PATENT DOCUMENTS

| 9,632,602 B2 | 4/2017 | Marwah et al. |
| 10,185,058 B2 | 1/2019 | Snyder et al. |

(Continued)

OTHER PUBLICATIONS

"Non Final Office Action Issued in U.S. Appl. No. 17/028,684", dated Mar. 14, 2022, 14 Pages.

(Continued)

*Primary Examiner* — Edward Tso
(74) *Attorney, Agent, or Firm* — Wade IP Law PLLC

(57) ABSTRACT

A charging system for a peripheral device, such as a stylus, including orientation control. The charging system includes charging circuitry and magnets. The magnets are configured so that they attract the peripheral device to an engagement surface when it is in a first orientation relative to the engagement surface so that charging circuitry in a peripheral device portion couples with charging circuitry in a charger portion. The magnets are configured so that they also repel and rotate the peripheral device when it is in a second orientation relative to the engagement surface.

20 Claims, 8 Drawing Sheets

Related U.S. Application Data

(60) Provisional application No. 62/909,133, filed on Oct. 1, 2019, provisional application No. 62/907,943, filed on Sep. 30, 2019.

(51) Int. Cl.
*H02J 7/00* (2006.01)
*G06F 3/0354* (2013.01)
*H02J 50/10* (2016.01)
*H02J 7/02* (2016.01)

(52) U.S. Cl.
CPC .............. *H02J 7/0047* (2013.01); *H02J 7/02* (2013.01); *H02J 50/10* (2016.02)

(58) Field of Classification Search
CPC .. H02J 50/10; G06F 2200/1632; G06F 1/266; G06F 1/1616; G06F 3/03545
USPC .......................................... 320/108, 114, 115
See application file for complete search history.

(56) References Cited

U.S. PATENT DOCUMENTS

| | | | |
|---|---|---|---|
| 11,239,710 B2* | 2/2022 | Gaule | ................... H02J 7/0047 |
| 2006/0142455 A1 | 6/2006 | Agarwal et al. | |
| 2008/0246181 A1 | 10/2008 | Zhu et al. | |
| 2011/0060106 A1 | 3/2011 | De et al. | |
| 2011/0224307 A1 | 9/2011 | Fenyvesi et al. | |
| 2014/0071654 A1 | 3/2014 | Chien et al. | |
| 2014/0151370 A1 | 6/2014 | Chang et al. | |
| 2015/0353732 A1 | 12/2015 | Wang | |
| 2016/0200937 A1 | 7/2016 | Hu et al. | |
| 2018/0218859 A1 | 8/2018 | Ligtenberg et al. | |
| 2019/0128648 A1 | 5/2019 | Bhatnagar et al. | |

OTHER PUBLICATIONS

"Final Office Action Issued in U.S. Appl. No. 17/028,684", dated Oct. 20, 2022, 14 Pages.
"Notice of Allowance Issued in U.S. Appl. No. 17/028,684", dated Feb. 2, 2023, 11 Pages.

* cited by examiner

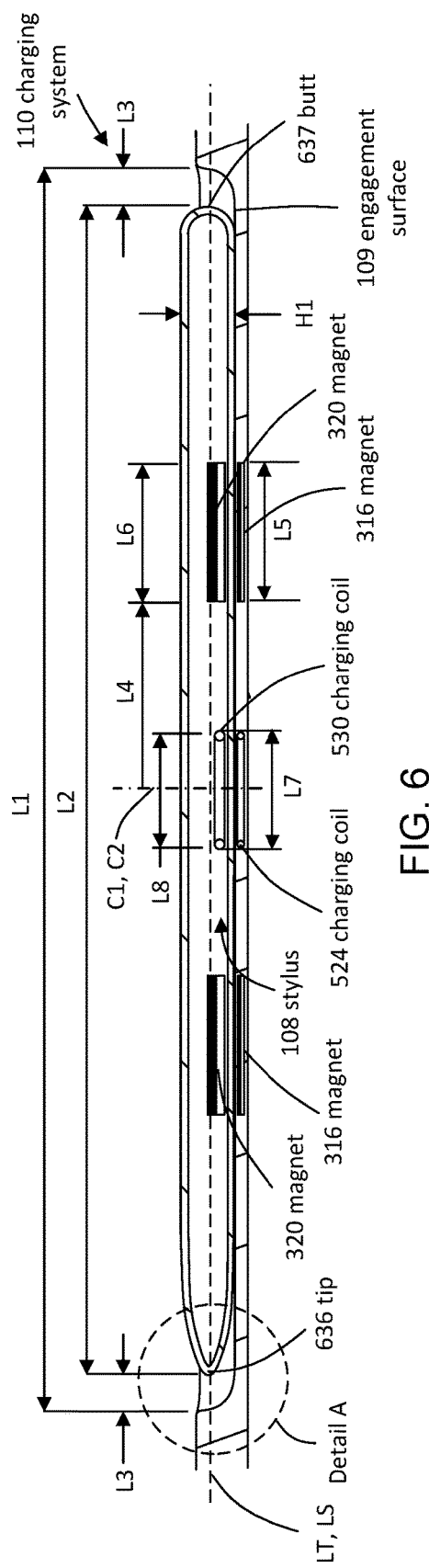
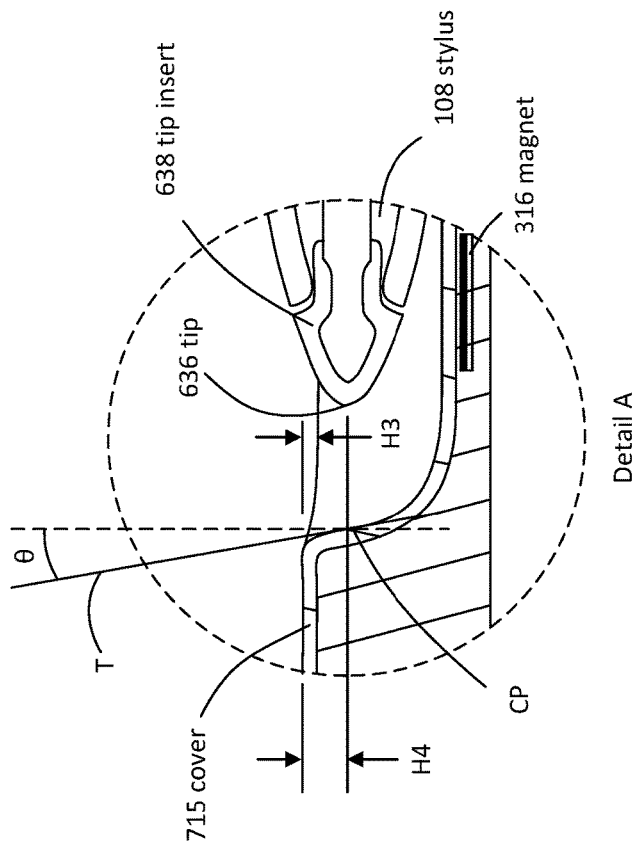
FIG. 6
FIG. 7

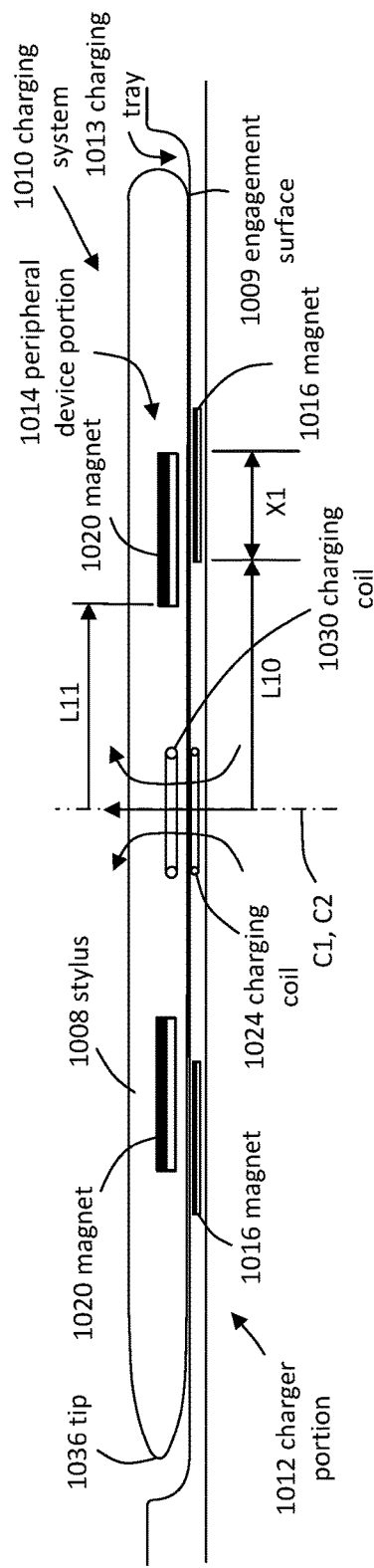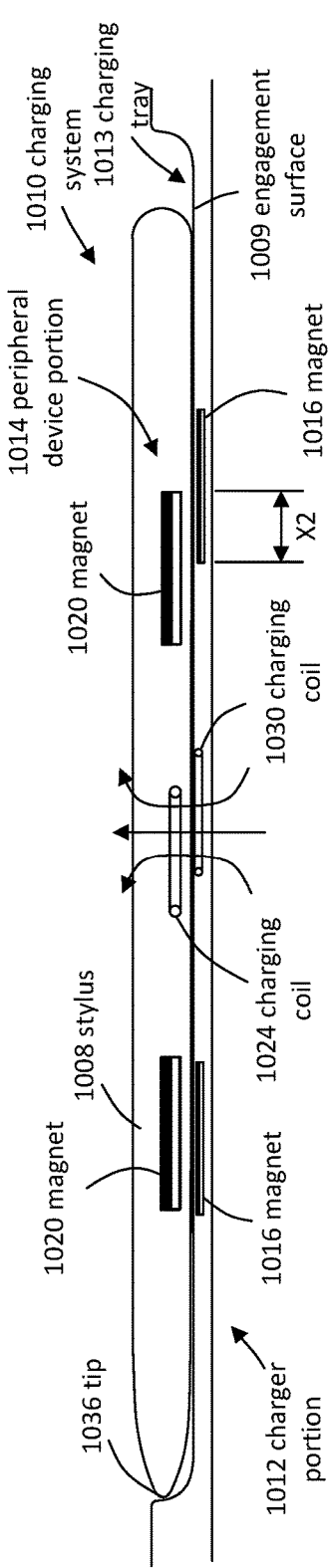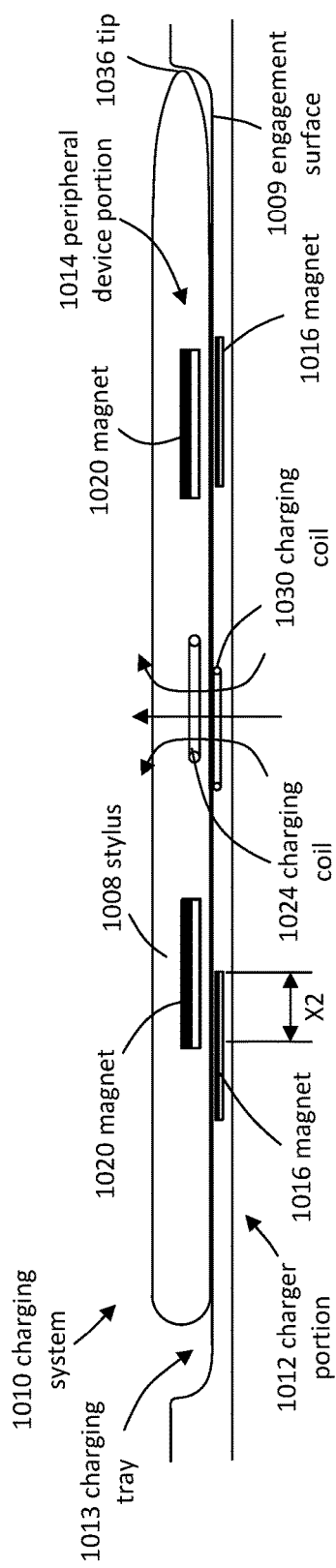

US 11,670,973 B2

CHARGING SYSTEM INCLUDING ORIENTATION CONTROL

CROSS-REFERENCE TO RELATED APPLICATION(S)

This application is a continuation of U.S. patent application Ser. No. 16/830,259, filed Mar. 25, 2020 and entitled "Charging System Including Orientation Control," which claims the benefit of U.S. Provisional Patent Application No. 62/909,133, filed Oct. 1, 2019 and entitled "Charging System Including Orientation Control," and U.S. Provisional Patent Application No. 62/907,943, filed Sep. 30, 2019 and entitled "Fabric Covered Device Portions," all of which are incorporated herein by reference in their entireties.

BACKGROUND

Computing devices that include touch-sensitive displays are often configured to receive input from a peripheral device, such as a stylus. The stylus may be configured to mimic the size, shape, and feel of a conventional writing device such as a pen or a pencil, and is oftentimes referred to as a "pen." The stylus often houses circuitry that is configured to allow the stylus to interact with the computing device by perform active functions using direct contact with the touch-sensitive display. For example, the stylus can be configured to provide functionality that imitates writing with a conventional writing device, and to allow the user to make selections and/or manipulate features displayed on the touch-sensitive display. The circuitry may be powered by a rechargeable battery located within the stylus.

SUMMARY

Various approaches are described herein for, among other things, providing a charging system configured to charge a rechargeable battery in a peripheral device. For instance, the charging system can be configured to force the peripheral device into a charging orientation relative to a charger portion of the charging system.

An example computing device comprises a first housing, a second housing, a hinge assembly, and a charger portion of a charging system. The hinge assembly includes a recessed charging tray and couples the first housing and the second housing such that the first housing hinges relative to the second housing. The charger portion is positioned within the hinge assembly in proximity to the recessed charging tray. The charger portion comprises a first charging circuit and a first dipole magnet. The charger portion is configured to wirelessly charge a peripheral device. The first dipole magnet is configured to interact with one or more magnets of the peripheral device such that when the peripheral device is in a first orientation the first dipole magnet attracts the peripheral device toward the charging tray and locates a charging circuit of the peripheral device within a charging distance of the first charging circuit, and when the peripheral device is in a second orientation the first dipole magnet causes the peripheral device to rotate toward the first orientation.

An example peripheral device comprises an elongate housing, at least one dipole magnet, a charging coil, a charging controller, and a rechargeable battery. The at least one dipole magnet is located within the housing and positioned laterally biased toward a first side of the housing relative to a longitudinal axis LS of the housing. The charging coil is configured to generate current when inductively coupled to a charger portion of a charging system and is located within the housing and positioned laterally biased toward the first side of the housing. The charging controller is located within the housing and is electrically coupled to the charging coil and configured to at least one of regulate or condition the current. The rechargeable battery is located within the housing and is electrically coupled to the charging coil and the charging controller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 6 is a cross-sectional view of a charging system in accordance with an embodiment corresponding to line 6-6 of FIG. 2.

FIG. 7 is a cross-sectional view of a portion of a charging system in accordance with an embodiment corresponding to detail A of FIG. 6.

FIGS. 10-12 are schematic views of an example charging system in accordance with an embodiment.

Figure 1:
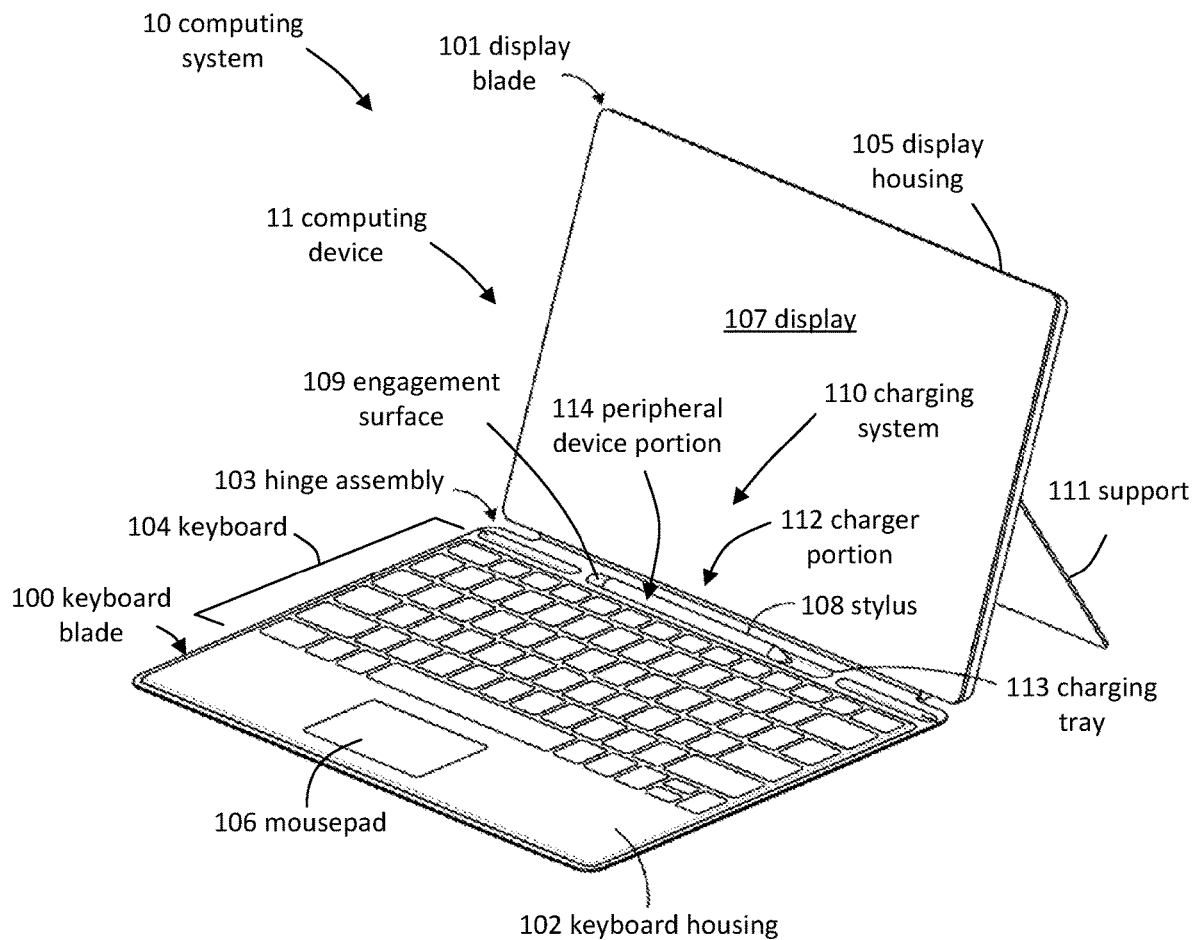
FIG. 1 is a perspective view of a computing system including a computing device, a peripheral device, and an example charging system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein provide improvements over known charging systems. For example, the charging systems described herein provide orientation control so that the peripheral device is forced into an orientation that allows it to engage a charger portion. As a result, a user is not required to properly orient the peripheral device before engaging the peripheral device with a charger portion, which simplifies the experience for the user. The example embodiments can also provide location control so that the peripheral device need only be roughly located by a user for charging and the charging system draws the peripheral device into a defined charging orientation and location relative to the charger portion.

Figure 2:
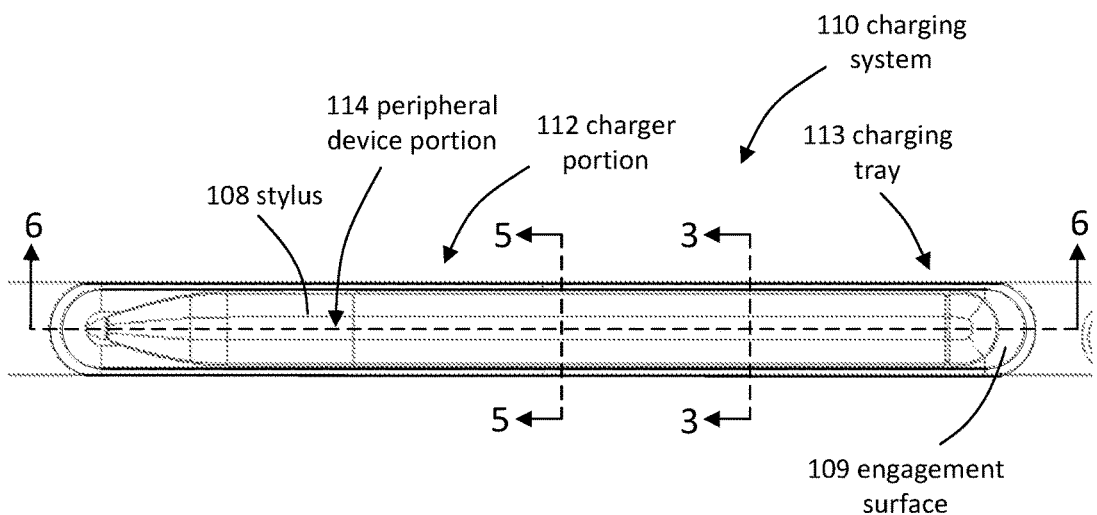
FIG. 2 is a top view of a portion of the computing system of FIG. 1 including an example charging system in accordance with an embodiment.

Referring to FIGS. 1 and 2, a computing system 10 includes a computing device 11 and a peripheral device. The charging system described herein can be incorporated into the computing device 11 or into an accessory, such as a docking station for the peripheral device. The computing device 11 can have any configuration such as a tablet computer configuration or a laptop computer configuration. For example, the computing device 11 can be a tablet computer constructed from a pair of articulated blades. The computing device 11 can include a keyboard blade 100 that is coupled to a display blade 101 by a hinge assembly 103, and the computing device 11 can be configured to include a charger portion 112 of a charging system 110 in any portion of the computing device 11.

In the illustrated embodiment, the keyboard blade 100 includes a keyboard housing 102 that supports any desired configuration or combination of input/output devices, houses circuitry, and defines any desired physical attributes such as size and shape. For example, the keyboard housing 102 can support a keyboard 104, a mousepad 106, and the charger portion 112 of the charging system 110. The keyboard housing 102 can be constructed from any structural material(s) such as polymers, metals or combinations thereof, and can be constructed with a surface treatment or surface material (e.g., fabric) to alter the characteristics (e.g., texture, appearance, etc.) of the surface of the housing 102.

The display blade 101 includes a display housing 105 that supports a display 107. The display housing 105 can support any desired configuration or combination of devices such as the display 107 and/or one or more cameras, house circuitry, and include a support 111 that can be used to hold the display 107 in a desired orientation relative to a support surface, such as a desk or table top. The display housing 105 can define any desired physical attributes such as size and shape.

The hinge assembly 103 couples the keyboard housing 102 and the display housing 105. The hinge assembly 103 is configured so that the keyboard housing 102 hinges relative to the display housing 105. The hinge assembly 103 can form a multi-hinge region of the computing device 11 that is formed from a combination of one or more rigid zones and one or more flexible zones. In the illustrated embodiment, the hinge assembly 103 includes a rigid zone that is interposed between a pair of flexible zones. The rigid zone can form a mid-spine portion of the hinge assembly 103 that includes a charging tray 113.

In the illustrated embodiment, the peripheral device is an elongate stylus 108 and the charging system 110 is configured to orient and charge the stylus 108 by orienting the stylus 108 relative to an engagement surface 109 included on the housing 102 of keyboard blade 100. The charging system 110 orients the stylus 108 by providing a mechanism that forms an attractive (i.e., a gravitational) force that draws the stylus 108 onto the engagement surface 109. The charging system 110 includes the charger portion 112 and a peripheral device portion 114. Each of the charger portion 112 and the peripheral device portion 114 can include components configured to physically and electrically interact and to provide the motive force to orient the stylus 108 relative to the engagement surface 109 and to electrically couple the charging circuitry of charger portion 112 with the charging circuitry of the peripheral device portion 114.

The engagement surface 109 defines the charging tray 113. In some example embodiments, the engagement surface 109 defines a recessed charging tray 113. In embodiments in which the charging tray 113 is recessed, the tray can be shaped and sized so that the stylus 108 is fully or partially recessed into the charging tray 113 so that the charging tray 113 is configured to receive at least a portion of the stylus 108. In the illustrated embodiment, the engagement surface 109 forms a recessed charging tray 113 that is shaped so that the stylus 108 is partially recessed into the recessed charging tray 113 so that a portion of the stylus 108 extends beyond the outermost edge of the charging tray 113, i.e., a portion of the stylus 108 stands proud of the charging tray 113. For example, a portion of the charging tray 113 can have a depth that is less than a thickness of a portion of the stylus 108 that is adjacent that portion of the charging tray 113.

As shown in FIG. 2, the stylus 108 can include an elongate housing that encloses the components of the peripheral device portion 114 of the charging system 110. In an example embodiment, the elongate housing is generally pen-shaped so that it includes a pointed tip end, that can be formed by a tip insert, and a blunt butt end. The stylus 108 can have a cross-sectional shape that provides a plurality of stable orientations when the stylus 108 is lying on its side on a support surface. In each of the stable orientations, the stylus rests on a portion of the outer surface of the elongate housing that forms a stable abutment region. The stable abutment region forms a portion that provides a lower potential energy orientation of the stylus 108. In the lower potential energy orientation the stylus 108 is oriented so that the stable abutment region abuts a support surface and the orientation of the stylus 108 is stable so that there is less of a tendency to flop or roll away from that orientation. For example, the housing of the stylus 108 can have an oblong cross-sectional shape, such as the elliptical cross-sectional shape as shown, so that the stylus 108 naturally has a tendency to lie in one of a plurality of predefined orientations. For example, because of the oblong cross-sectional shape, the stylus 108 is configured to naturally lie on a support surface (e.g., on engagement surface 109) with the poles of included magnets and a minor axis of the ellipse aligned generally normal to the support surface. As a result, if a user places the stylus 108 on a support surface in a configuration in which the major axis of the elliptical cross-section is normal to the support surface the stylus will naturally try to roll into a more stable position. In other embodiments, the cross-sectional shape can have a polygonal shape or another shape that results in a plurality of known stable positions when a side of the stylus is resting on a support surface. For example, a polygonal cross-sectional shape results in a plurality of facets on the housing and each of those facets forms a stable abutment region. In another example, the cross-sectional shape of the housing can be non-uniform, such as a truncated circular cross-section that defines a facet.

Still further, the stylus 108 can be weighted so that the center-of-gravity of the stylus is biased laterally relative to the longitudinal axis LS so that the stylus 108 has a tendency to roll into a position wherein the center-of-gravity is closest to the support surface. In such a weighted example, the portion of the outer wall closest to the center-of-gravity would define a stable abutment region. Still further, the position of the dipole magnets alone can define a stable abutment region. For example, and as will be described in greater detail below, the orientation of the included magnets and corresponding magnets of the charger portion 112 can urge the stylus 108 into the charging orientation in which a portion of the outer wall of the housing abuts the engagement surface 109. The magnetic attraction defines a portion of the housing that abuts the engagement surface 109 when the stylus 108 is in the charging orientation and that portion of the housing defines a stable abutment region.

The charging tray 113 can be shaped and sized to complement the shape and size of the elongate housing of the stylus 108. The shape and size of the charging tray 113 can also be selected to limit the relative movement of the stylus 108 and the charging tray 113. In at least one example embodiment, the charging tray 113 is recessed and shaped to prevent substantial relative translation between the stylus 108 and the charging tray 113 in a direction transverse to the longitudinal axis LS of the stylus 108 and a longitudinal axis LT of the charging tray 113, i.e., to prevent substantial side-to-side movement of the stylus 108 in the charging tray 113. The charging tray 113 is also sized and shaped to permit rotation of the stylus 108 about the longitudinal axis LS of the stylus 108 when the stylus 108 is disposed in the recessed charging tray 113.

Figure 3:
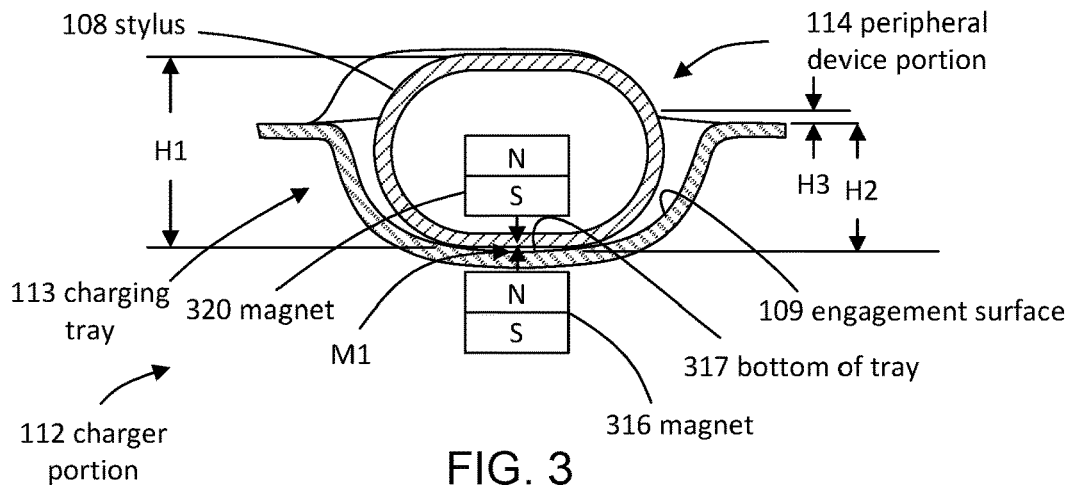
FIG. 3 is a cross-sectional view of a portion of a charging system in accordance with an embodiment corresponding to line 3-3 of FIG. 2.
Figure 4:
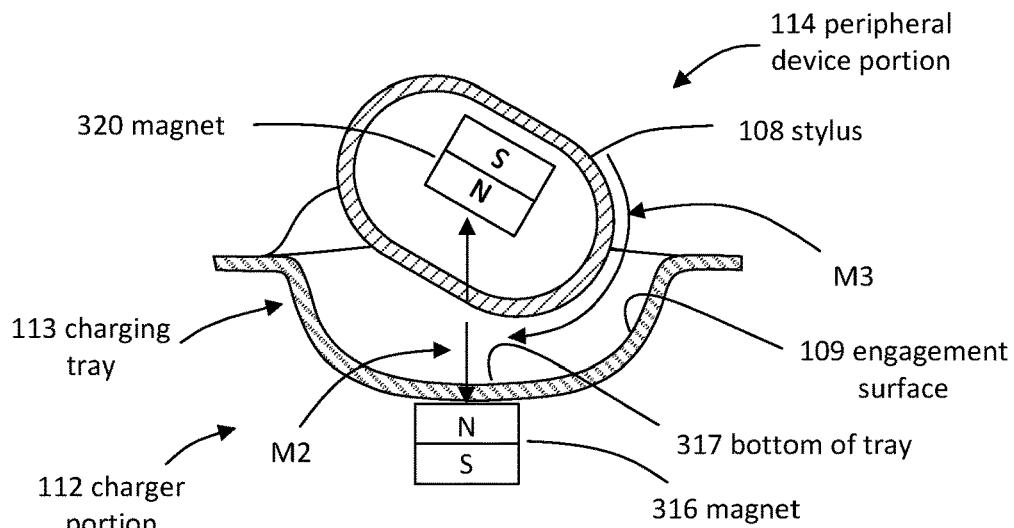
FIG. 4 is a cross-sectional view of the portion of a charging system of FIG. 3, illustrating a second orientation of a peripheral device in accordance with an embodiment.
Figure 5:
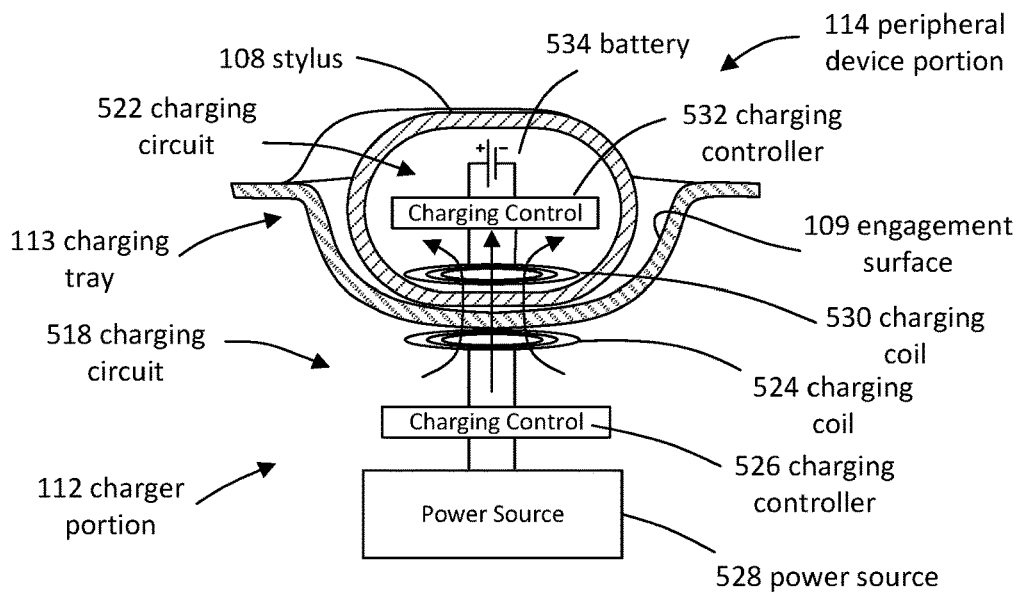
FIG. 5 is a cross-sectional view of a portion of a charging system in accordance with an embodiment corresponding to line 5-5 of FIG. 2.

Referring to FIGS. 3-5, the charger portion 112 of the charging system 110 includes orienting componentry and charging componentry. The combination of the charger portion 112 with the charging tray 113 forms a charger for the peripheral device. For example, the orienting componentry can include at least one dipole magnet 316, and the charging componentry can include a charging circuit 518. In an example embodiment, the magnet 316 and the charging circuit 518 of the charger portion 112 are located in the keyboard housing 102 of the keyboard blade 100. In the illustrated embodiment, the charging tray 113 is an elongate recess and the charger portion 112 includes a plurality of dipole magnets 316 that are spaced from each other in the direction along the longitudinal axis LT of the charging tray 113. The magnets 316 are positioned so that they are adjacent a portion of the engagement surface 109 that forms the innermost wall, i.e., the bottom 317, of the charging tray 113 that abuts the stylus 108 when the stylus 108 is disposed in the charging tray 113. The magnets 316 can be recessed into the wall of the charging tray 113. Additionally, the magnets 316 can be spaced from the cavity formed by the recessed charging tray 113 by a wall of the housing 102 and/or a cover layer 715, such as a fabric cover. The magnets 316 are oriented relative to the charging tray 113 in predefined orientations and locations selected so that the magnets 316 are configured to interact with dipole magnets included in the peripheral device portion 114. For example, that interaction can be utilized to manipulate the orientation of the stylus 108 relative to the charger portion 112 and to retain the stylus 108 in abutment with the engagement surface 109, such as in the charging tray 113.

The peripheral device portion 114 of the charging system 110 also includes orienting componentry and charging componentry. For example, the orienting componentry can include at least one dipole magnet 320, and the charging componentry can include a charging circuit 522. In an example embodiment, the magnet 320 and the charging circuit 522 are located in a housing of the stylus 108 so that they are enclosed inside the stylus 108. In the illustrated embodiment, the peripheral device portion 114 includes a plurality of dipole magnets 320 that are spaced from each other in the direction of the longitudinal axis LS of the housing of the stylus 108. The magnets 320 are positioned laterally biased relative to the longitudinal axis LS of the stylus 108 so that they are adjacent an outer wall of the stylus 108. The magnets 320 are also oriented so that a magnetic field vector extending through the poles of each magnet 320 is substantially normal to the outer wall of an adjacent portion of the housing. In an example embodiment, the magnets 320 are positioned adjacent a portion of the outer wall of the stylus 108 that is configured to abut the engagement surface 109 in the charging tray 113 when the stylus 108 is disposed in the charging tray 113 and in a charging orientation. In the charging orientation, the charging circuit 522 in the peripheral device portion 114 is oriented so that the charging circuit 522 can be electrically coupled to the charging circuit 518 in the charger portion 112. The magnets 320 are oriented relative to the stylus 108 in predefined orientations and locations selected so that the magnets 320 interact with the magnets 316 included in the charger portion 112 to manipulate the orientation and position of the stylus 108 relative to the charger portion 112. For example, the configuration of the magnets is selected so that the stylus 108 can be forced into the charging orientation. The configuration of the magnets can also be selected to draw the stylus 108 into the charging tray 113 and to retain the stylus 108 within the charging tray 113.

Referring to FIG. 3, the stylus 108 is illustrated in the charging orientation and disposed in the charging tray 113 so that a portion of the stylus 108 is received in the charging tray 113. In that configuration, the dipole magnets are oriented so that the dipole magnet 316 of the charger portion 112 is attracted, by an attractive magnetic force M1, to the dipole magnet 320 of the peripheral device portion 114. In at least one example embodiment, the strengths and spacing of the dipole magnets 316 and the dipole magnets 320 are selected to provide sufficient magnetic attractive force so that the stylus 108 is magnetically retained in the charging tray 113. Additionally, when the stylus 108 is magnetically retained in the charging tray 113 the configuration of the magnets 316, 320 is selected so that the stylus 108 is retained in the charging orientation and at a charging distance, i.e., a distance that allows the charging circuit 518 in the charger portion 112 to electrically couple to the charging circuit 522 in the peripheral device portion 114.

In the illustrated embodiment, the stylus 108 is oriented so that a south pole of the magnet 320 is nearest a north pole of the magnet 316. For example, the magnet 316 of the charger portion 112 is oriented so that the north pole of the magnet 316 is closer to the engagement surface 109 than the south pole of the magnet 316. Additionally, the magnet 320 of the peripheral device portion 114 is oriented so that the south pole of the magnet 320 is closer to the engagement surface 109 and the north pole of the magnet 316 of the charger portion 112 than the south pole of the magnet 320 when the stylus 108 is in the charging orientation. As a result, the magnets 316, 320 are configured to provide an attractive (i.e., a gravitational) magnetic force between the stylus 108 and the engagement surface 109

The dimensions of the stylus 108 and the recessed charging tray 113 can be selected to provide the user with a desired experience, which can include ease of use. For example, the dimensions of the stylus 108 and the recessed charging tray 113 can be selected to simplify behavior required of a user to manipulate the stylus 108, such as to insert the stylus 108 into the charging tray 113 and into the charging orientation or to remove the stylus 108 from the charging tray 113. In an example embodiment, a thickness H1 of the stylus 108 can be greater than a depth H2 of an adjacent portion of the recessed charging tray 113, when the thickness H1 is measured in the same direction as the depth H2 of the charging tray 113 when the stylus 108 is in the charging orientation. In that example, only a portion of the stylus 108 is received by the recessed charging tray 113 so a first portion of the stylus 108 is recessed into the charging tray 113 and a second portion of the stylus 108 extends out of the recessed charging tray 113 and can be manipulated by the user. In example embodiments, the depth H2 of the recess can be in a range between about 25% and about 80% of the thickness H1 of an adjacent portion of the stylus 108 so that the stylus is only partially recessed into the charging tray. In an example embodiment, the depth H2 of the recess can be about 65% of the thickness H1 of the adjacent portion of the stylus 108. In other example embodiment, the depth H2 of the recess can be 1.0 mm and about 8.0 mm with an adjacent portion of the stylus 108 having a thickness H1 in a range between about 4.0 mm and about 10.0 mm. In an example embodiment, the depth H2 of the recess can be about 4.1 mm and the thickness H1 of the adjacent portion of the stylus 108 can be about 6.3 mm.

The dimensions at the ends of the recessed charging tray 113 can also be selected to provide the user with a desired experience. For example, the depth of the charging tray 113 at the ends of the charging tray 113 can be selected so that when the stylus 108 is translated in the direction of the longitudinal axis LS of the stylus 108, the tip end and the butt end abut the ends of the charging tray 113. The abutment between the stylus 108 and the ends of the charging tray 113 can be used to simplify extraction of the stylus 108 from the charging tray 113, as will be discussed in greater detail below with reference to FIGS. 8 and 9. In example embodiments, the depth H2 of at least one end of the recess is greater than ½ the thickness H1 of the stylus 108. In an example embodiment, both ends of the elongate recessed charging tray 113 can have depths H2 that are greater than ½ the thickness H1 of the stylus 108.

The depth of the recessed charging tray 113 can vary around the perimeter of the charging tray 113 to define a depth difference H3. In an example, shown in FIGS. 6 and 7, at least one end of the charging tray 113 can have a depth that is greater than a side portion of the charging tray 113. For example, the depth of at least one end of the recess can be greater than a depth at the elongate sides of the recess by a depth difference H3 that is in a range between about 0.2 mm and about 1.0 mm. In an example embodiment, the depth difference H3 of at least one end of the recess is about 0.5 mm. In additional embodiments, both ends of the elongate recess can have depth difference H3 that is about 0.5 mm.

During use, a user can insert the stylus 108 into the charging tray 113 in any rotational orientation, and the charging system 110 is configured to re-orient the stylus 108 relative to the charging tray 113, if necessary, to rotate the stylus 108 into the charging orientation. Referring to FIG. 4, the stylus 108 is shown in a rotational orientation other than the charging orientation, i.e., the stylus 108 is in an orientation in which the stylus 108 is rotated about the longitudinal axis LS of the stylus 108 that is different than the predefined charging orientation. When the stylus 108 is oriented in the illustrated orientation, the north pole of the magnet 320 in the stylus 108 is disposed closer to the north pole of the magnet 316 of the charger portion 112 than the south pole of the dipole magnet 320 is to the north pole of the magnet 316. As a result, a repelling magnetic force M2 and a rotational magnetic force M3 are formed between the stylus 108 and the charging tray 113. The strength and location of the magnets 316 and 320, and/or the dimensions of the charging tray 113, can be selected so that the stylus 108 can remain partially received by the charging tray 113 even while being acted upon by the repelling magnetic force M2. For example, the strength and location of the magnets 316 and 320 can be selected so that the stylus 108 is not fully ejected from the charging tray 113 when the stylus 108 is inserted while in the rotational orientation other than the charging orientation. In another example, the depth of the charging tray 113, or portions of the charging tray 113, can be selected so that the strength of the repelling magnetic force M2 is insufficient to fully eject the stylus 108 from the charging tray 113. The repelling magnetic force M2 and the rotational magnetic force M3 work in conjunction to force the re-orientation of the stylus 108 relative to the charging tray 113 into the charging orientation. After the stylus 108 is re-oriented, the attractive magnetic force M1 is formed and draws the stylus 108 into the recess of the charging tray 113 and into a charging distance, as shown in FIG. 3.

It should be appreciated that the magnets 316, 320 can have any orientation that provides the attractive magnetic force M1 when the stylus 108 is in the charging orientation, and the repelling magnetic force M2 and rotating magnetic force M3 when the stylus 108 is in an orientation other than the charging orientation. In the illustrated embodiments, the magnets 316 of the charger portion 112 are oriented with the north poles closest to the engagement surface 109. Accordingly, the magnets 320 of the stylus are oriented so that when the stylus is in the charging orientation the south poles of the magnets 320 are closest to the engagement surface 109. In another example embodiment, the magnets 316 of the charger portion 112 can be oriented with the south poles closest to the engagement surface 109 with corresponding magnets 320 of the stylus 108 oriented so that when the stylus 108 is in the charging orientation the north poles of the magnets 320 are oriented closest to the engagement surface 109. Additionally, the magnets 320 can be laterally biased relative to the longitudinal axis LS of the stylus 108 to increase the attractive magnetic force M1 when the stylus 108 is in the charging orientation and/or to allow the use of smaller magnets 320 in the stylus 108.

The charging orientation of the stylus 108 relative to the engagement surface 109 allows for charging of the stylus 108. Referring to FIG. 5, when the stylus 104 is oriented in the charging orientation and at a charging distance, the charging circuit 518 of the charger portion 112 is positioned so that the charging circuit 518 electrically couples with the charging circuit 522 of the peripheral device portion 114 so that the rechargeable battery of the stylus 108 can be charged. In the illustrated embodiment, the charging circuit 518 of the charger portion 112 and the charging circuit 522 of the peripheral device portion 114 are configured to provide inductive charging of the stylus 108 so that electrical contacts requiring direct physical contact are not required between the charger portion 112 and the peripheral device portion 114.

The charging circuit 518 of the charger portion 112 includes a charging coil 524, a charging controller 526, and a power source 528. The charging coil 524 is disposed in the housing 102 to position the charging coil 524 adjacent the engagement surface 109. The charging coil 524 is configured to inductively couple to another coil that is positioned within a charging distance of the charging coil 524. In the illustrated embodiment, the charging coil 524 is disposed adjacent the engagement surface 109 but recessed from the engagement surface 109 so that it is not visible to a user. The charging controller 526 regulates current generated by the power source 528 and directs the current through the charging coil 524.

The charging circuit 522 of the peripheral device portion 114 includes a charging coil 530, a charging controller 532, and a rechargeable battery 534. The charging coil 530 is positioned in the stylus 108 so that it is closest to the engagement surface of the charging tray 113 when the stylus 108 is in the recessed charging tray 113 and in the charging orientation. The charging coil 530 is configured to inductively couple to a charger, such as charger portion 112 including charging coil 524, when the charging coil 530 is positioned within a charging distance of the charger. In example embodiments, the position of the charging coil 530 in the stylus is laterally biased in the stylus 108 toward a stable abutment region of the outer surface of the housing of the stylus 108. Additionally, the charging coil 530 is located in the stylus 108 so that the charging coil 530 is within a charging distance of the charging coil 524 of the charger portion 112 when the stylus 108 is in the recessed charging tray 113 and in the charging orientation. The charging distance corresponds to a distance that permits the charging circuit 518 to electrically couple with the charging circuit 522, i.e., the distance that permits the magnetic field generated by the charging coil 524 to create a current in the charging coil 530 so that the charging coil 524 and the charging coil 530 are inductively coupled.

In some embodiments, the size of the elongate housing of the stylus 108 limits the size of the charging coil 530 that can be included in the stylus 108. As the size of the stylus 108 is reduced, the size of the charging coil 530 that can fit within the stylus 108 is reduced, and the reduction in the size of the charging coil 530 can reduce the charging distance. As a result, the laterally biased positioning of the charging coil 530 can be used to reduce the distance between the charging coil 530 of the stylus 108 and the charging coil 524 of the charger portion 112 in at least one orientation of the stylus 108 relative to the charging tray 113 so that the stylus 108 can be charged even with a reduced charging distance. In at least one embodiment, the size of the charging coil 530 of the stylus 108 and the biased location of the charging coil 530 within the housing of the stylus 108 permit the stylus 108 to be charged when the stylus 108 is in a first orientation relative to the charging tray 113, and not charged when the stylus 108 is in a second orientation relative to the charging tray 113. For example, in the first orientation (i.e., the charging orientation) the laterally biased location of the charging coil 530 results in the charging coil 530 being positioned within the charging distance of the charging coil 524 of the charger portion 112 so that the charging coil 530 can be inductively coupled to the charging coil 524. In the second orientation, the laterally biased location of the charging coil 530 results in the charging coil 530 being spaced greater than the charging distance from the charging coil 524 of the charger portion 112.

The charging controller 532 is electrically coupled to the charging coil 524 and the rechargeable battery. The charging controller 532 is configured to regulate and/or condition current generated in the charging coil 530 by the inductive coupling between the charging coil 524 of the charger portion 112 and the charging coil 530 of the peripheral device portion 114. The charging controller 532 also directs the generated current to the rechargeable battery 534 to charge the rechargeable battery 534. The stylus 108 and/or the charger portion 112 can also include an indicator that is electrically coupled to the charging circuitry that notifies a user when the stylus 108 is charging. For example, the indicator can be any feature that provides visual and/or audible feedback to a user, such as a visible light-emitting diode, or an audible chime. Still further, the indictor can have different configurations that indicate a charging condition, such as an amount of charging that has been completed. For example, a visual indicator can be configured to provide different colors, and an audible indicator can have different sounds associated with different charging conditions.

Referring to FIGS. 6 and 7, the charger portion 112 includes a plurality of magnets 316 and the peripheral device portion 114 includes a plurality of complementary magnets 320. For example, the magnets 316 are disposed adjacent the engagement surface 109 in the charging tray 113, and the magnets 320 are disposed adjacent a wall of the housing of the stylus 108. In an example embodiment, each of the magnets 316 and magnets 320 is a permanent dipole magnet so that each magnet defines a north pole and a south pole. The magnets 316 of the charger portion 112 and the magnets 320 of the peripheral device portion 114 have a common orientation when the stylus 108 is in the charging orientation. For example, magnetic field vectors extending through the poles of the magnets 316, 320 are parallel and oriented in the same direction so that the magnets generate an attractive magnetic force M1. Additionally, the dipole magnets are oriented so that magnetic field vectors are oriented substantially normal to the outer wall of the housing of the stylus 108 and to the engagement surface 109 within the charging tray The magnets 316 of the charger portion 112 are spaced from each other in a direction parallel to the longitudinal axis LT of the charging tray 113. In an example embodiment, the magnets 316 can be spaced equidistant from a central normal axis C1 of the charging tray 113 and on opposite sides of the central normal axis C1 along the longitudinal axis LT of the charging tray 113. The central normal axis C1 is an axis that is oriented perpendicular to the longitudinal axis LT, substantially normal to the engagement surface 109, and substantially parallel to a magnetic field vector of magnets 316 at a location equidistant from the ends of the charging tray 113. In an example embodiment, the dipole magnets 316 are spaced from the central normal axis C1 of the charging tray 113 by a distance in a range between about 10.0 mm and about 30.0 mm. In an example embodiment, the magnets 316 are spaced from the central normal axis C1 by about 22.0 mm.

The charging coil 524 of the charger portion 112 can be disposed in a central portion of the charging tray 113. In an example embodiment, the central normal axis C1 extends through a portion of the charging coil 524 of the charger portion 112. For example, the charging coil 524 can be located so that it is centered along the longitudinal length of the charging tray 113, i.e., so that the central normal axis C1 extends through a center of the charging coil 524. The size of the charging coil 524 can be selected to provide a predefined amount of overlap between the charging coil 524 of the charger portion 112 and the charging coil 530 of the peripheral device portion 114 when the stylus 108 is disposed in the charging tray 113 regardless of the relative longitudinal position of the stylus 108 within the charging tray 113. For example, a length L2 of the stylus 108 can be less than a length L1 of the charging tray 113, and the charging coils 524, 530 can be sized and positioned to provide inductive charging even when the stylus 108 is biased to one end of the charging tray 113 or the other.

The magnets 320 of the peripheral device portion 114 can spaced from each other to complement the configuration of the magnets 316 of the charger portion 112. The magnets 320 can be disposed in the stylus 108 so that they are biased transversely (i.e., laterally) relative to the longitudinal axis LS toward a side of the housing of the stylus 108. The magnets 320 can be spaced from each other in a direction parallel to the longitudinal axis LS, and the magnets 320 can be spaced from a central radial axis C2 of the housing of the stylus 108. The central radial axis C2 is an axis that is oriented perpendicular to the longitudinal axis LS so that it extends substantially radially through the outer wall of the housing of the stylus 108, and substantially parallel to the magnetic field vector of magnets 320 at a location equidistant from the ends of the stylus 108. The central radial axis C2 also generally intersects a stable abutment region of the housing of the stylus 108. The spacing of the magnets 320 from each other and the central radial axis C2 can be selected so that the magnets 316 of the charger portion 112 are at least partially aligned with the magnets 320 of the peripheral device portion 114 in the stylus 108 when the stylus 108 is disposed in the charging tray 113.

In the configuration shown in FIG. 6, the magnets 316 of the charger portion 112 are aligned with the magnets 320 of the peripheral device portion 114 in the stylus 108. For example, the stylus 108 is positioned in the charging tray 113 so that the central normal axis C1 of the charging tray 113 is coincident with the central radial axis C2 of the stylus 108, and the longitudinal axis LT of the charging tray 113 is coincident with the longitudinal axis LS of the stylus 108. In that configuration, each magnet 316 of the charger portion 112 is centered with respect to a respective magnet 320 of the stylus 108. As a result, the magnets 316, 320 are positioned to provide a maximum overlap when the stylus 108 is centered in the charging tray 113.

The magnets 316, 320 are configured to orient the stylus 108 relative to the charging tray 113 so that the stylus 108 is forced into an orientation that allows the rechargeable battery of the stylus 108 to be charged. Any number of the magnets 316, 320 can be included in the respective charger portion 112 and peripheral device portion 114. The orientation of the dipole magnets (i.e., the orientation of the poles of the magnets) is the same for the magnets in each of the respective charger portion 112 and peripheral device portion 114 so that the relative position of the stylus 108 in the charging tray 113 can be controlled and limited to positions in which charging is possible. In particular, including the dipole magnets in a common orientation can help to avoid the inclusion of magnetically stable relative positions between the stylus 108 and the charging tray 113 in which the charging circuit 518 of the charger portion 112 is not able to electrically couple with the charging circuit 522 of the peripheral device portion 114, or magnetically stable relative positions in which the stylus 108 is not properly disposed in the charging tray 113 for charging. Accordingly, in some example embodiments of the charging system 110, the magnets 316, 320 have a common orientation of the north and south poles when the stylus 108 is oriented relative to the charging tray 113 in the charging orientation.

In alternative embodiments, the dipole magnets can have different orientations for the magnets in each of the respective charger portion 112 and peripheral device portion 114, and the size and shape of the charging tray 113, or adjacent features, can be selected to prevent the inclusion of magnetically stable relative positions between the stylus 108 and the charging tray 113 in which the charging circuit 518 of the charger portion 112 is not able to electrically couple with the charging circuit 522 of the peripheral device portion 114, or magnetically stable relative positions in which the stylus 108 is not properly disposed in the charging tray 113 for charging. For example, the dipole magnets can be arranged in Halbach array and flux fountain configurations to increase a magnetic force generated by the array of magnets. In each of those types of magnetic arrays, the magnets are arranged having magnets with different orientations with regard to the north and south poles. Including an array of magnets having varying orientations in the charger portion 112 or in a peripheral device portion 114 can result in multiple magnetically stable configurations between the stylus 108 and the charging tray 113 but the size and shape of the charging tray 113, or adjacent features, can be employed to limit the configurations to those configurations that allow the stylus 108 to charge and to prevent any configurations in which charging of the stylus 108 is not possible.

The length L2 of the stylus 108 and the length L1 of the charging tray 113 can be selected to provide consistent charging of the stylus 108 regardless of the position of the stylus 108 in the charging tray 113 and a desired user experience. In example embodiment illustrated in FIG. 6, the overall length L2 of the stylus 108 is less than the overall length L1 of the charging tray 113. In an example embodiment, the overall length L2 of the stylus 108 and the overall length L1 of the charging tray 113 are selected to provide a nominal gap L3 between the housing of the stylus 108 and the recessed charging tray 113 at each end when the stylus 108 is centered in the charging tray 113 that is in a range between about 3.0 mm and about 10.0 mm. In an example embodiment, the nominal gap L3 is about 4.2 mm. In another example embodiment, the nominal gap L3 is about 4.9 mm. The lengths can be selected relative to the desired overlap of the charging coils to assure charging of the stylus 108 regardless of whether the stylus 108 is biased to one end, or the other, within the charging tray 113, i.e., so that the charging coil 524 of the charger portion 112 and the charging coil 530 of the peripheral device portion 114 overlap regardless of the position of the stylus 108 within the charging tray 113. In an example embodiment, the overall length L1 of the charging tray 113 is about 145.0 mm and the overall length L2 of the stylus 108 is about 137.0 mm. The lengths can also be selected so that during removal a total gap size formed when the position of the stylus 108 is biased toward an end of the charging tray 113, i.e., 2× the nominal gap L3, is large enough to allow a user to use a finger to fit at least partially into the gap to manipulate an end of the stylus 108. In another example embodiment, the overall length L2 of the housing of the stylus 108 and the overall length L1 of the recessed charging tray 113 are selected so that the overall length L2 of the stylus 108 is less than the overall length L1 of the charging tray 113 by a distance in a range between about 5.0 mm and about 20.0 mm to provide the desired nominal gap L3 and total gap.

The ends of the charging tray 113 can be configured to interact with the tip end 636, that can be formed by the tip insert 638, and the butt end 637 of the stylus 108 during removal of the stylus 108 from the charging tray 113. For example, a height of the end surfaces of the tray can be selected so that the tip end 636 or the butt end 637 of the stylus 108 abuts an end surface when the stylus 108 is positioned in the charging tray 113 so that the stylus 108 is biased toward an end of the charging tray 113. In an example, the relative height H4 between an end surface of the charging tray 113 and the tip 636 of the stylus 108 is selected so that when stylus 108 is positioned so that it is biased with the tip 636 abutting an end of the tray, the tip 636 contacts the end surface of the charging tray 113. For example, the relative height H4 defines a difference in the height of the tip 636 relative to the height of the end surface of the charging tray 113 where the height of the end of the charging tray 113 is greater than the height of the tip 636 so that the tip 636 can contact the end surface of the charging tray 113. In an example embodiment, the height difference H4 is at least 1.0 mm. In an example embodiment, the height difference H4 is about 1.45 mm.

The ends of the charging tray 113 can also be shaped to interact with the tip 636 and/or the butt end 637 of the stylus 108. For example, a surface angle θ of a tangent line T of the end surface of the charging tray 113 can be selected to prevent the stylus 108 from sliding up the end surface and lifting out of the charging tray 113 at the end when the stylus 108 is forced toward the end surface by a user. For example, a surface angle θ of a tangent line T of the end surface of the charging tray 113, where the tangent line T is located at a contact point CP between the stylus 108 and the end surface of the charging tray 113 can be selected to prevent the stylus 108 from sliding up the end surface. The surface angle θ is measured in a plane defined by the longitudinal axis LT and the central normal axis C1 of the charging tray 113. For example, the surface angle θ can be defined at a location where the tip 636 would contact the end surface of the charging tray 113 if the position of the stylus 108 were biased toward the end surface. In an example embodiment, the surface angle θ can be in a range of about +/−10°, with a positive angle indicating a tapered surface that results in the charging tray 113 narrowing deeper in the recess and a negative angle indicating an undercut. In an example embodiment, the surface angle θ is in a range between about 5° and about 10°.

The number, sizes, and materials of the magnets 316, 320 can be selected to provide a desired magnetic force between the charger portion 112 and the peripheral device portion 114. In an example embodiment, each of the magnets 316 of the charger portion 112 can have a length L5 in a range between about 5.0 mm and about 20.0 mm. Each of the magnets 320 of the peripheral device portion 114 can have a length L6 that is also in a range between about 5.0 mm and about 20.0 mm. In some example embodiments, the length L5 of each of the magnets 316 is the same as the length L6 of each of the magnets 320. In an example embodiment, the magnets 316 and 320 have a length of about 16.0 mm. Alternatively, the magnets 316 and the magnets 320 can have different lengths.

In other example embodiments, a single dipole magnet can be included in each of the charger portion 112 and the peripheral device portion 114. In at least one example embodiment, the magnets can be disposed centrally in each of the charger portion 112 and peripheral device portion 114 so that they are adjacent the charging coils 524 and 530. In an example embodiment, the magnets can be centered with the charging coils 524 and 530 with a respective single dipole magnet centered in each of the stylus 108 and the charging tray 113.

In all of the embodiments described herein, the magnets, such as magnets 316, 320, can be constructed from any permanent magnet material. For example, the magnets can be rare-earth magnets such as neodymium-iron-boron magnets or samarium-cobalt magnets.

The charging coil 524 of the charger portion 112 and the charging coil 530 of the peripheral device portion 114 are sized and positioned so that they overlap and provide inductive coupling between the charger portion 112 and the peripheral device portion 114. For example, the charging coils 524, 530 are sized and positioned to provide charging of the stylus regardless of the position of the stylus 108 in the charging tray 113, i.e., whether the stylus 108 is centered longitudinally in the charging tray 113 or biased toward one end or the other of the charging tray 113. The charging coils 524, 530 can also be sized and positioned to provide charging of the stylus regardless of the direction of the stylus 108 within the charging tray 113, i.e., whether the tip 636 of the stylus 108 is directed to a first end or a second end of the charging tray 113. The charging coil 524 of the charger portion 112 can have a length L7 that is the same as a length L8 of the charging coil 530 of the peripheral device portion 114. In some embodiments, the length L7 of the charging coil 524 of the charger portion 112 is different than the length L8 of the peripheral device portion 114. In an example embodiment, the charging coils 524, 530 have lengths L7, L8 in a range between about 10.0 mm and about 30.0 mm. Additionally, the coils 524, 530 can be aligned so that central axes of the coils are coincident and aligned with the central normal axis C1 of the tray 113 when the stylus 108 is centered longitudinally in the charging tray 113 so that the amount of overlap between the coils 524, 530 is the same when the stylus 108 is fully biased toward either end of the charging tray 113 so that the stylus 108 is biased as far as possible toward an end of the charging tray 113.

Figure 8:
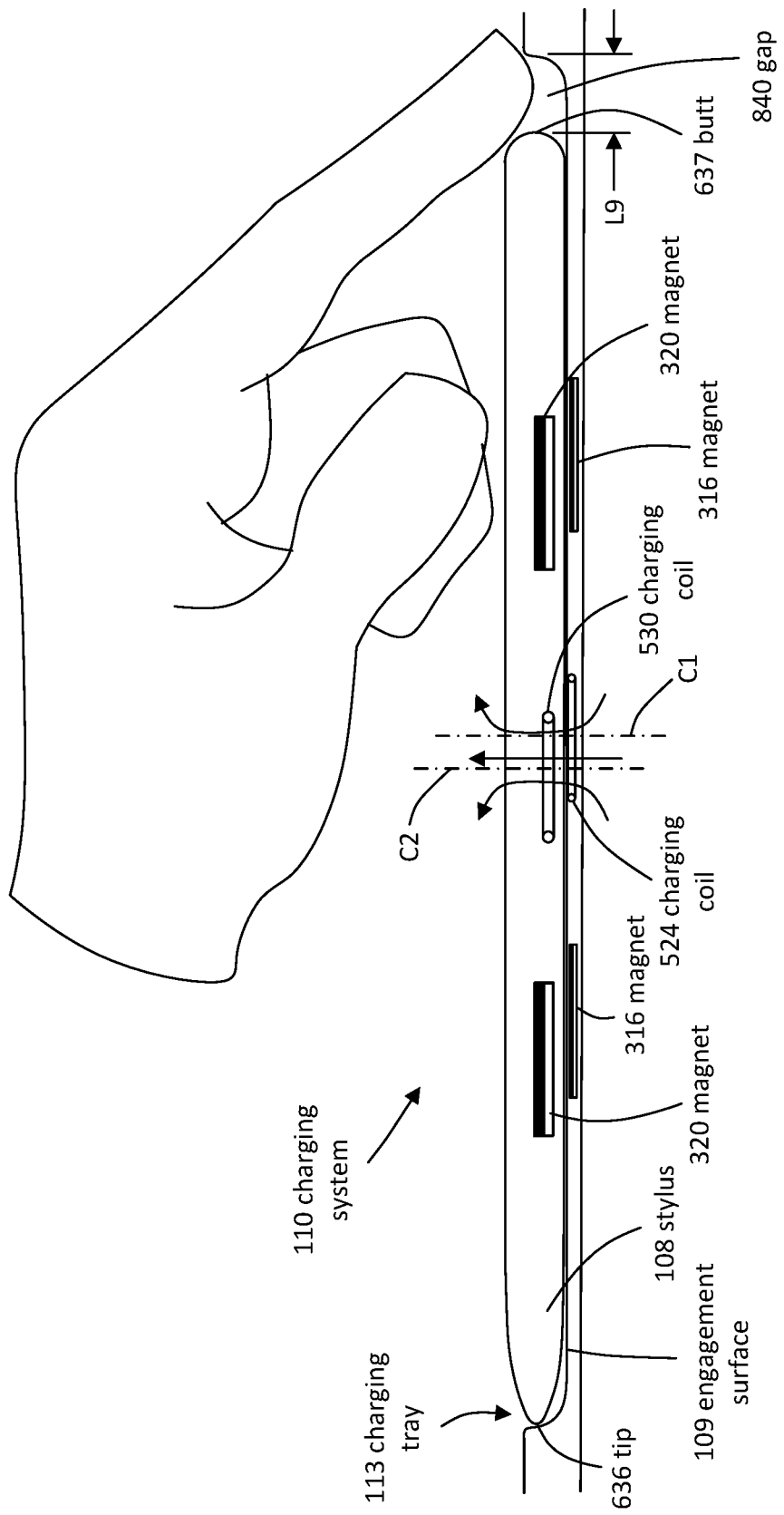
FIGS. 8 and 9 are schematic views showing the use of charging system in accordance with an embodiment.
Figure 9:
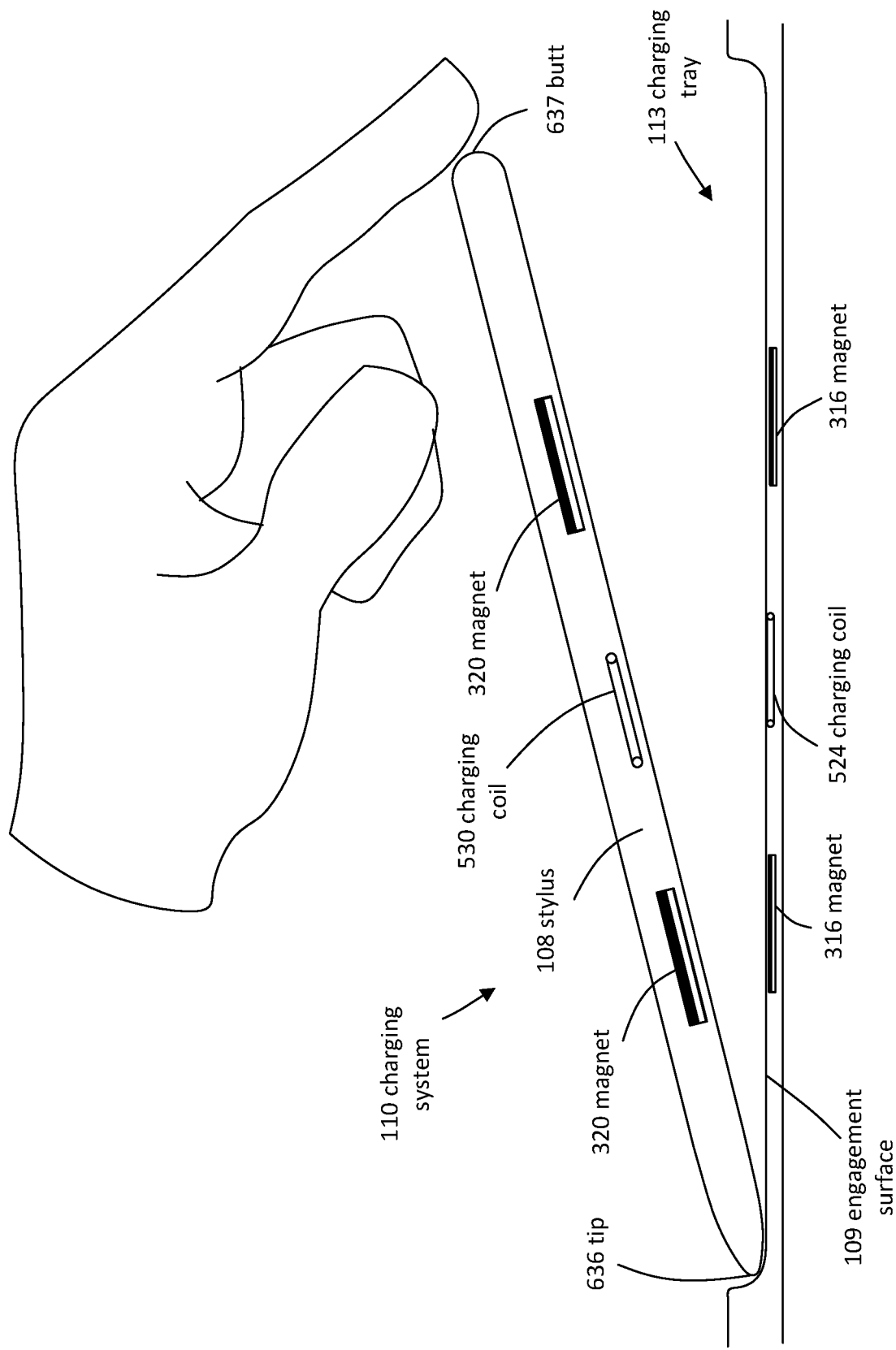

Referring to FIGS. 8 and 9, a method of removing the stylus 108 from the charging tray 113 will be described. When a user desires to remove the stylus 108 from the charging tray 113, the user urges the stylus 108 toward an end of the charging tray 113. For example, the user can use a finger placed on the butt end 637 of the stylus 108 to slide the stylus 108 within the charging tray 113 in the direction of the longitudinal axis LT of the charging tray 113 so that the tip 636 is moved toward an end of the charging tray 113. As shown in FIG. 8, the stylus 108 can be pushed so that the tip 636 of the stylus 108 abuts an end surface at a first end of the charging tray 113 by pushing the butt end 637 of the stylus 108 longitudinally. As the stylus 108 is slid further toward an end surface of the charging tray 113, a gap 840 between the butt end 637 of the stylus 108 and a second end of the charging tray 113 widens and can accommodate better control over the movement of the stylus 108 by the user. For example, the widening gap 840 can allow more contact between the butt end 637 of the stylus 108 and a user's finger to allow the user to more easily manipulate the stylus 108.

As described above, the overall length L1 of the charging tray 113 and the overall length L2 of the stylus 108 can be selected to provide a desired nominal gap having a length L3. In the configuration shown in FIG. 8, the gap 840 is maximized so that it equals a total gap that has a length L9 that corresponds to double the length of the nominal gap (i.e., 2× the nominal gap). For example, the length L9 of the gap 840 can be selected so that it is large enough for a finger size of a user. In example embodiments, the length L9 can be in a range between about 5.0 mm and about 20.0 mm. In example embodiments, the length L9 can be in a range between about 7.0 mm and about 10.0 mm. In an example embodiment, the length L9 is about 8.2 mm. In another example embodiment, the nominal gap is about 9.0 mm.

Referring to FIG. 9, after the stylus 108 is urged toward an end of the charging tray 113 with the tip 636 abutting an end surface of the charging tray 113, the butt end 637 of the stylus 108 adjacent the gap 840 can be lifted. For example, the butt end 637 of the stylus 108 can be lifted and lifting the butt end 637 of the stylus 108 results in the stylus 108 being tilted with the butt end 637 being raised away from the engagement surface 109. The tip 636 of the stylus 108 and the end surface of the charging tray 113 are configured so that the tip 636 remains in contact with the charging tray 113 while the butt end 637 is lifted. For example, the surface angle θ of the end surface of the charging tray 113 is configured to prevent the tip 636 from sliding up the end surface of the charging tray 113 when the user urges the stylus 108 toward the end of the charging tray 113. After the butt end 637 is raised away from the engagement surface 109 and out of the charging tray 113, then stylus 108 can be grasped by the user and removed entirely from the charging tray 113. As the stylus 108 is tilted out of the charging tray 113, the distance between the charger portion 112 and the peripheral device portion 114 is increased until the attractive force M1 between the magnets 316 and 320 is overcome. It should be appreciated that the user can perform the process by manipulating and lifting the tip 636 of the stylus 108 and forcing the butt end 637 of the stylus 108 into an end of the charging tray 113.

Referring to FIGS. 10-12, an example embodiment of a charging system 1010 that includes magnets 1016, 1020 having a configuration that can be used to provide a different magnitude of attractive magnetic force M1 based on the position of a stylus 1008 in a charging tray 1013 will be described. For example, the configuration of the magnets 1016, 1020 can be used so that when the stylus 1008 is urged toward an end of the charging tray 1013 during removal the magnitude of the attractive magnetic force M1 between the magnets closest to the end that is lifted away from an engagement surface 1009 and out of the charging tray 1013 is lower than between the magnets furthest from the end that is lifted. As illustrated, the magnets 1016 of a charger portion 1012 are only partially aligned with the magnets 1020 of a peripheral device portion 1014 in the stylus 1008, when the stylus 1008 is centered in the charging tray 1013.

The charging system 1010 includes the charger portion 1012 and the peripheral device portion 1014. The charger portion 1012 includes the engagement surface 1009 that defines the recessed charging tray 1013, a plurality of magnets 1016, and a charging coil 1024. The peripheral device portion 1014 includes a plurality of magnets 1020, and a charging coil 1030. Similar to previous embodiments, the charger portion 1012 can be disposed in the housing of a computing device, such as in a blade of a tablet computer, and the peripheral device portion 1014 can be disposed in a housing of a peripheral device, such as the stylus 1008.

In the charging system 1010, the magnets 1016 of the charger portion 1012 are spaced from a central normal axis C1 of the charging tray 1013 by a distance L10. The magnets 1020 of the peripheral device portion 1014 are spaced from a central radial axis C2 of the stylus 1008 by a distance L11. In the illustrated embodiment, the distance L10 is different than the distance L11. In an example embodiment, the distance L10 is greater than L11.

The distances L10 and L11 are selected so that an overlap between corresponding pairs of the magnets 1016 and the magnets 1020 has a different predefined distance depending on the location of the stylus 1008 within the charging tray 1013. For example, the overlap has different distances when the stylus 1008 is located in different positions within the charging tray 1013. For example, when the stylus 1008 is centered longitudinally in the charging tray 1013, each of the magnets 1016 overlaps with a respective magnet 1020 by a distance X1 that is selected to provide sufficient attractive magnetic force to retain the stylus 1008 in the charging tray 1013. Additionally, when the stylus 1008 is centered longitudinally in the charging tray 1013, the coils 1024, 1030 overlap so that the coils 1024, 1030 inductively couple and provide charging of the stylus 1008.

The overlap between the magnets 1016, 1020 and between the coils 1024, 1030 is selected so that the orientation, charging, and retention of stylus 1008 is maintained regardless of the location of the stylus 1008 within the charging tray 1013. The overlap between the magnets 1016, 1020 and between the coils 1024, 1030 is also selected so that the orientation, charging, and retention of the charging system 1010 is maintained regardless of which direction the stylus 1008 is oriented in the charging tray 1013, i.e., if a tip 1036 of the stylus 1008 is directed toward either a first end or a second end of the charging tray 1013. In addition, the configuration of the magnets 1016, 1020 provides a reduction of the attractive magnetic force M1 at one end of the stylus 1008 relative to the charging tray 1013 when the stylus 1008 is biased longitudinally relative to the charging tray 1013 while the stylus 1008 is still sufficiently retained in the charging tray 1013.

As shown in FIG. 11, the stylus 1008 can be positioned so that it is biased toward an end of the charging tray 1013. For example, the stylus 1008 can be positioned so that the tip 1036 of the stylus 1008 is adjacent a first end of the charging tray 1013. In that configuration, the overlap of the magnets 1016 and 1020 located closer to a second end of the charging tray 1013 and a butt end 1037 of the stylus 1008, define an overlap that is reduced in comparison to the configuration in which the stylus 1008 is centered in the charging tray 1013 (shown in FIG. 10). As a result, an attractive force between the magnets 1016 and 1020 closest to the second end of the charging tray 1013 and the butt end 1037 of the stylus 1008 is reduced. In addition, the overall length of the stylus 1008, the overall length of the tray 1013, and the sizes and locations of the charging coils 1024 and 1030 are selected so that the coils 1024 and 1030 are able to inductively couple to provide charging of the battery of the stylus 1008.

As shown in FIG. 12, the stylus 1008 is biased relative to the charging tray 1013 and directed so that the tip 1036 of the stylus 1008 is adjacent the second end of the charging tray 1013, i.e., opposite to the direction shown in FIG. 11. In that configuration, the overlap of the magnets 1016 and 1020 located closer to the first end of the tray 1013 and the butt end 1037 of the stylus 1008 define an overlap that is reduced in comparison to the configuration in which the stylus 1008 is centered in the charging tray 1013 (shown in FIG. 10). As a result, an attractive magnetic force M1 between the magnets 1016 and 1020 closest to the first end of the charging tray 1013 and the butt end 1037 of the stylus 1008 is reduced. In addition, the overall length of the stylus 1008, the overall length of the charging tray 1013, and the sizes and locations of the charging coils 1024, 1030 are selected so that the coils 1024, 1030 are able to inductively couple to provide charging of the battery of the stylus 1008 in any of the configurations. It should be appreciated, that in the reduction in the overlap occurs between the magnets 1016, 1020 that are disposed closer to the tip 1036 if the user elects to manipulate and lift the tip 1036 of the stylus 1008 instead of the butt end 1037 of the stylus 1008. For example, regardless of the end of the stylus 1008 that the user chooses to lift out of the charging tray 1013, the overlap between the magnets 1016, 1020 closest to the lifted end is reduced thereby reducing the attractive magnetic force M1 closest to the lifted end.

Figure 13:
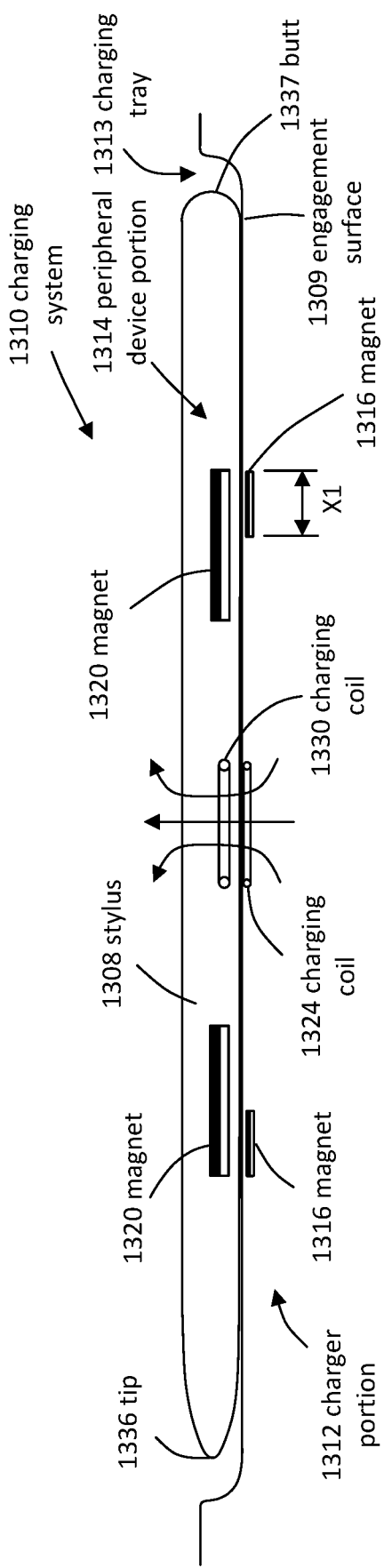
FIGS. 13 and 14 are schematic views of an example charging system in accordance with an embodiment.
Figure 14:
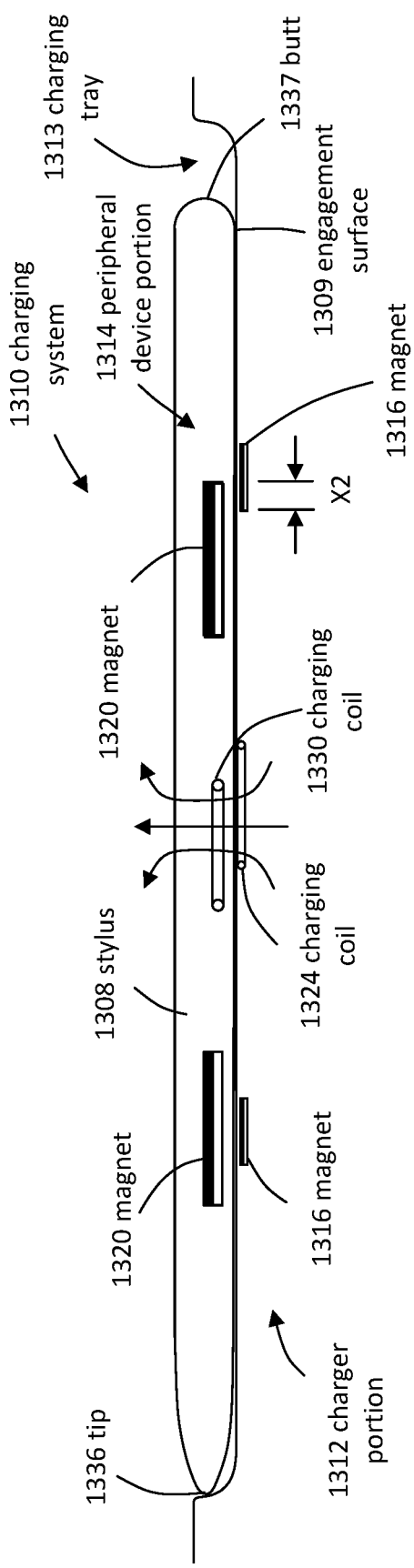

Referring to FIGS. 13 and 14, another example embodiment of a charging system 1310 that includes magnets 1316, 1320 that have another example configuration will be described. For example, the configuration can utilize different lengths of magnets 1316, 1320 to provide different attractive magnetic force M1 in different configurations of a stylus 1308 relative to a charging tray 1313. The magnet configuration that can be used to provide a different attractive magnetic force M1 during removal of the stylus 1308 from a charging tray 1313 compared to when the stylus 1308 is centered in the charging tray 1313. The magnet configuration can be selected so that removal of the stylus 1308 from the charging tray 1313 is simplified while still maintaining the orientation, charging, and retention of the stylus 1308 regardless of the position and direction of the stylus 1308 in the charging tray 1313. The charging system 1310 includes a charger portion 1312 and a peripheral device portion 1314. The charger portion 1312 includes and engagement surface 1309 that defines the charging tray 1313, a plurality of magnets 1316 and a charging coil 1324. The peripheral device portion 1314 includes a plurality of magnets 1320 and a charging coil 1330. Similar to previous embodiments, the charger portion 1312 can be disposed in the housing of a computing device, such as in a blade of a tablet computer, and the peripheral device portion 1314 can be disposed in a housing of a peripheral device, such as the stylus 1308.

As illustrated in FIG. 13, the magnets 1316 of the charger portion 1312 are partially aligned with the magnets 1320 of the peripheral device portion 1314 in the stylus 1308, when the stylus 1308 is centered in the charging tray 1313. In the charging system 1310, the magnets 1316 of the charger portion 1312 are sized so that there is an overlap with the magnets 1320 of the peripheral device portion 1314. The overlap varies dependent on the position of the stylus 1308 within the charging tray 1313. When the stylus 1308 is positioned so that it is centered longitudinally in the charging tray 1313, as shown in FIG. 13, the overlap has a distance X1. The distance X1 is selected to provide sufficient attractive magnetic force to retain the stylus 1308 in the charging tray 1313. Additionally, in that position, the coils 1324 and 1330 overlap to inductively couple the stylus 1308 and the charging tray 1313. In an example embodiment, the magnets 1316 of the charger portion 1312 have a length of about 10.0 mm and the magnets 1320 of the peripheral device portion 1314 have a length of about 16.0 mm.

The orientation, charging, and retention of the charging system 1310 is maintained regardless of the bias of the stylus 1308 in the charging tray 1313, and regardless of which way the stylus 1308 is directed in the charging tray 1313. In addition, the configuration of the magnets 1316 and 1320 provides a reduction of the magnetic attraction of one end of the stylus 1308 relative to the charging tray 1313 when the stylus 1308 is biased longitudinally relative to the charging tray 1313. That reduction can be used to simplify the removal by making it easier for a user to lift that end of the stylus.

As shown in FIG. 14, the stylus 1308 is biased relative to the charging tray 1313 and directed so that a tip 1336 of the stylus 1308 is adjacent a first end of the charging tray 1313. In that configuration, the overlap of the magnets 1316 and 1320 located closer to a second end of the charging tray 1313 and a butt end 1337 of the stylus 1308 has a distance X2 that is reduced in comparison to the configuration in which the stylus 1308 is centered in the charging tray 1313, in which the magnets have an overlap with a distance X1. As a result, an attractive magnetic force M1 between the magnets 1316 and 1320 closest to the second end of the charging tray 1313, and the butt end 1337 of the stylus 1308 is reduced. In addition, the overall length of the stylus 1308, the overall length of the charging tray 1313, and the sizes and locations of the charging coils 1324 and 1330 are selected so that the coils 1324 and 1330 are able to inductively couple to provide charging of the battery of the stylus 1308.

Figure 15:
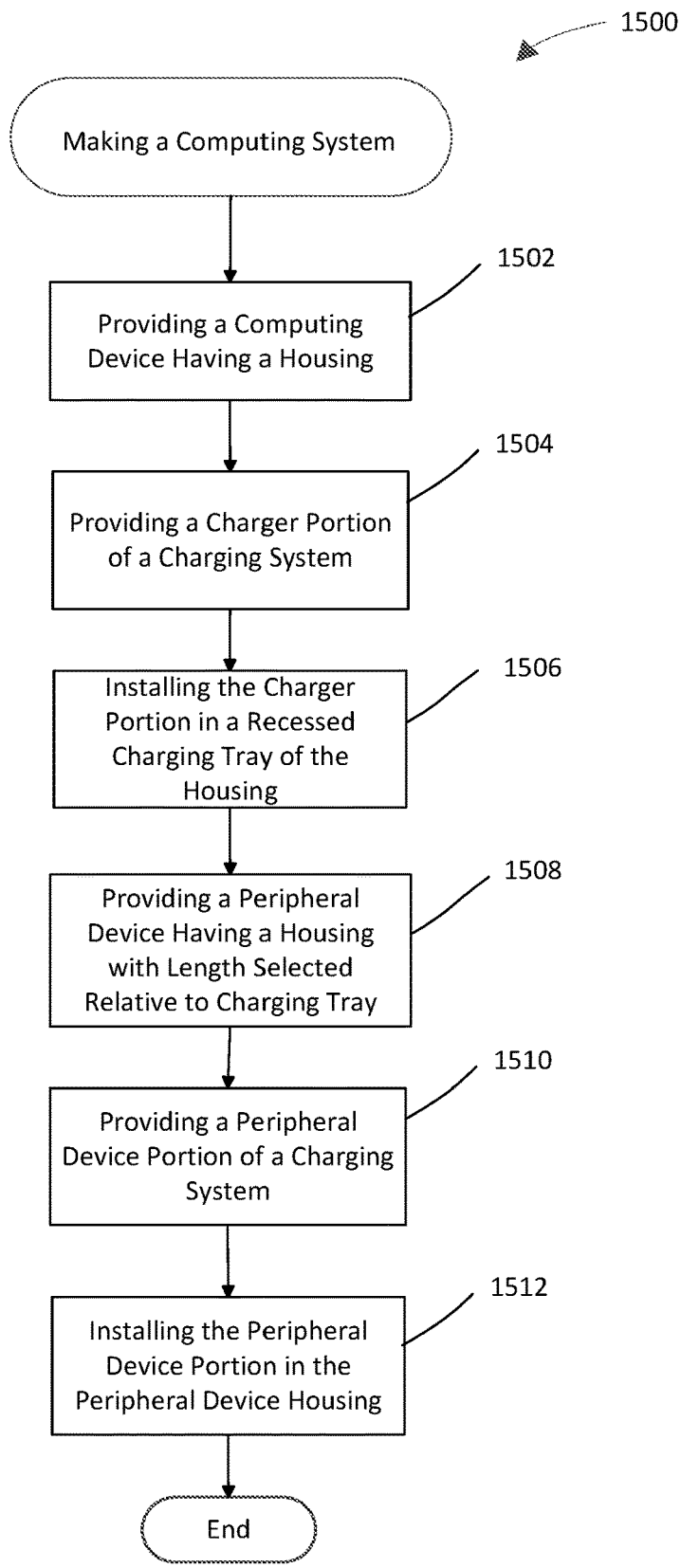
FIG. 15 depicts a flowchart of an example method of making a computing system in accordance with at least one embodiment.

FIG. 15 depicts a flowchart 1500 of an example method of making a computing system including a charging system in accordance with at least one embodiment. The method of flowchart 15 can be used to construct the various embodiments of FIGS. 1-14, for example. Further structural and operational embodiments will be apparent to persons skilled in the relevant art(s) based on the discussion regarding flowchart 1500.

As shown in FIG. 15, the method of flowchart 1500 begins at step 1502. In step 1502, a computing device having a housing is provided. The computing device can be a tablet computer, a laptop computer, or any other computing device having a housing. In at least one embodiment, the computing device includes a housing 102 that is part of a keyboard blade 100 that forms a portion of a tablet computer. The housing 102 can include an engagement surface 109 that defines an elongate recessed charging tray 113.

At step 1504, a charger portion of a charging system is provided. In at least one embodiment, the charger portion 112 includes orienting componentry and charging componentry. For example, the orienting componentry can include at least one dipole magnet 316, and the charging componentry can include a charging circuit 518. The charging circuit 518 of the charger portion 112 can include a charging coil 524, a charging controller 526, and a power source 528.

At step 1506, the charger portion is installed in a recessed charging tray of the housing of the computing device. In at least one embodiment, the charger portion 112 is installed in the recessed charging tray 113 so that a plurality of magnets 316 are positioned so that they are adjacent a portion of the engagement surface 109. Additionally, a charging coil 524 of the charger portion is positioned adjacent the engagement surface 109.

At step 1508, a peripheral device having a housing with a length that is selected relative to the charging tray is provided. The peripheral device can be a stylus 108. In at least one embodiment, the stylus 108 is elongate and includes an elongate housing. The overall length L2 of the housing of the stylus 108 and the overall length L1 of the recessed charging tray 113 can be selected so that the overall length L2 of the stylus 108 is less than the overall length L1 of the charging tray 113 by a distance in a range between about 5.0 mm and about 20.0 mm.

At step 1510, a peripheral device portion of a charging system is provided. In at least one embodiment, the peripheral device portion 114 also includes orienting componentry and charging componentry. For example, the orienting componentry can include at least one dipole magnet 320, and the charging componentry can include a charging circuit 522.

At step 1512, the peripheral device portion is installed in the peripheral device housing. In an example embodiment, the stylus 108 includes an elongate housing that encloses the components of the peripheral device portion 114 of the charging system 110.

In some embodiments of the method, the first charging circuit comprises a first charging coil and the second charging circuit comprises a second charging coil, the housing of the peripheral device defines a tip end and a butt end, and the second coil is centered longitudinally between the tip end and the butt end.

In some embodiments of the method, the housing of the peripheral device defines a tip end and a butt end, a relative height defined by a difference between a height of the tip end and a height of an end surface of the recessed charging tray is at least 1.0 mm, and the height of the end surface of the charging tray is greater than the height of the tip.

In some embodiments of the method, at least one end surface of the recessed charging tray defines a surface angle θ that is in a range between about 5° and about 10°, the surface angle θ is measured in a plane defined by the longitudinal axis LT and a central normal axis C1 of the charging tray, and the central normal axis C1 is an axis that is oriented perpendicular to a longitudinal axis LT of the recessed charging tray and substantially normal to the engagement surface at a location equidistant from ends of the recessed charging tray.

III. Further Discussion of Some Example Embodiments (A1) A computing device (e.g., FIG. 1, 11) comprises a first housing (e.g., FIG. 1, 102), a second housing (e.g., FIG. 1, 105), a hinge assembly, and a charger portion of a charging system. The hinge assembly (e.g., FIG. 1, 103) includes a recessed charging tray (e.g., FIG. 1, 113) and couples the first housing and the second housing such that the first housing hinges relative to the second housing. The charger portion (e.g., FIG. 1, 112) is positioned within the hinge assembly in proximity to the recessed charging tray. The charger portion comprising a first charging circuit (e.g., FIG. 5, 518) and a first dipole magnet (e.g., FIG. 3, 316). The charger portion is configured to wirelessly charge a peripheral device (e.g., FIG. 1, 108). The first dipole magnet is configured to interact with one or more magnets (e.g., FIG. 3, 320) of the peripheral device such that when the peripheral device is in a first orientation, the first dipole magnet attracts the peripheral device toward the charging tray and locates a charging circuit of the peripheral device within a charging distance of the first charging circuit, and when the peripheral device is in a second orientation, the first dipole magnet causes the peripheral device to rotate toward the first orientation.

(A2) In the computing device of A1, where the first charging circuit is configured so that when the peripheral device in the first orientation, a first side of the peripheral device is facing a bottom (e.g., FIG. 3, 317) of the charging tray to locate the charging circuit of the peripheral device within the charging distance of the first charging circuit, and when the peripheral device is in the second orientation a second side of the peripheral device is facing the bottom of the charging tray and the first side is not facing the bottom of the charging tray to space the charging circuit of the peripheral device greater than the charging distance from the first charging circuit.

(A3) In the computing device of A1-A2, where the first dipole magnet is configured to interact with the one or more magnets of the peripheral device such that the peripheral device is caused to rotate toward the first orientation in conjunction with gravitational force pulling the peripheral device into the charging tray.

(A4) In the computing device of A1-A3, where the first housing supports a keyboard (e.g., FIG. 1, 104) and the second housing supports a display (e.g., FIG. 1, 107).

(A5) In the computing device of A1-A4, where the first dipole magnet is configured to interact with the one or more magnets of the peripheral device to cause the peripheral device to move laterally to align the first charging circuit with the charging circuit of the peripheral device.

(A6) In the computing device of A1-A5, where the first charging circuit comprises a first charging coil (e.g., FIG. 5, 524), and wherein the first charging coil is configured to inductively couple with a charging coil (e.g., FIG. 5, 530) of the charging circuit of the peripheral device when a peripheral device housing of the peripheral device is within the charging distance.

(A7) In the computing system of A1-A6, where the charger portion includes a plurality of first dipole magnets spaced from each other.

(A8) In the computing system of A7, where the charging tray is elongate and defines a longitudinal axis LT, where the plurality of first dipole magnets are spaced equidistant from a central normal axis C1 of the charging tray, and where the central normal axis C1 is an axis that is oriented perpendicular to the longitudinal axis LT of the charging tray and substantially normal to a bottom (e.g., FIG. 3, 317) of the charging tray at a location equidistant from ends of the charging tray.

(A9) In the computing system of A7, where the charging tray is elongate and defines a longitudinal axis LT, where the plurality of first dipole magnets are spaced from a central normal axis C1 of the charging tray by a distance in a range between about 10.0 mm and about 30.0 mm, and where the central normal axis C1 is an axis that is oriented perpendicular to the longitudinal axis LT of the charging tray and substantially normal to a bottom of the charging tray at a location equidistant from ends of the charging tray.

(A10) In the computing system of A1-A9, where the charging tray is elongate and defines a longitudinal axis LT, wherein at least one end surface of the charging tray defines a surface angle θ that is in a range between about 5° and about 10°, where the surface angle θ is measured in a plane defined by a longitudinal axis LT and a central normal axis C1 of the charging tray, and where the central normal axis C1 is an axis that is oriented perpendicular to the longitudinal axis LT of the charging tray and substantially normal to a bottom of the charging tray at a location equidistant from ends of the charging tray.

(A11) In the computing system of A1-A10, where the hinge assembly includes at least one rigid zone interposed between flexible zones, and where the charging tray is disposed in the rigid zone.

(B1) A peripheral device comprises an elongate housing, at least one dipole magnet (e.g., FIG. 3, 320), a charging coil (e.g., FIG. 5, 530), a charging controller (e.g., FIG. 5, 532), and a rechargeable battery (e.g., FIG. 5, 534). The at least one dipole magnet (e.g., FIG. 3, 320) is located within the housing and positioned laterally biased toward a first side of the housing relative to a longitudinal axis LS of the housing. The charging coil (e.g., FIG. 5, 530) is configured to generate current when inductively coupled to a charger portion (e.g., FIG. 1, 112) of a charging system (e.g., FIG. 1, 110). The charging coil is located within the housing and positioned laterally biased toward the first side of the housing. The charging controller (e.g., FIG. 5, 532) is located within the housing, and the charging controller is electrically coupled to the charging coil and configured to at least one of regulate or condition the current. The rechargeable battery (e.g., FIG. 5, 534) is located within the housing and electrically coupled to the charging coil and the charging controller.

(B2) In the peripheral device of B1, where the peripheral device comprises a plurality of dipole magnets, where the housing defines a central radial axis C2 that is perpendicular to the longitudinal axis LS so that it extends substantially radially through the outer wall of the housing and substantially parallel to a magnetic field vector of the at least one dipole magnet, where the central radial axis C2 extends through a portion of the charging coil, and where the plurality of dipole magnets are spaced equidistant from the central radial axis C2.

(B3) In the peripheral device of B1-B2, where the housing has an oblong cross-sectional shape that defines a plurality of stable abutment regions, and wherein the first side comprises a stable abutment region of the plurality of stable abutment regions.

(B4) In the peripheral device of B1-B3, where the peripheral device is a stylus and the housing defines a tip end (e.g., FIG. 6, 636) and a butt end (e.g., FIG. 6, 637).

(B5) In the peripheral device of B1-B4, where the peripheral device comprises a plurality of dipole magnets, where each of the plurality of dipole magnets is positioned laterally biased relative to the longitudinal axis LS of the housing.

(B6) In the peripheral device of B1-B5, where the at least one dipole magnet is configured to interact with one or more magnets of the charger portion to locate the charging coil of the peripheral device within a charging distance of a charging coil of the charger portion of the charging system.

(B7) In the peripheral device of B6, where the at least one dipole magnet is configured such that the interaction causes the peripheral device to rotate around the longitudinal axis LS such that the first side of the housing is facing the charger portion of the charging system.

(B8) In the peripheral device of B6, where the interaction causes the peripheral device to move laterally in the direction along a radial axis to shorten a distance between the charging coil of the peripheral device and the charging coil of the charger portion of the charging system.

(B9) In the peripheral device of B1-B8, further comprising an indicator configured to notify a user when the peripheral device is charging.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing device, comprising:
   a first housing;
   a second housing;
   a hinge assembly that includes a recessed charging tray, the hinge assembly coupling the first housing to the second housing; and
   a charger portion of a charging system, the charger portion positioned within the hinge assembly, the charger portion comprising:
      a first charging circuit; and
      a first dipole magnet;
   wherein the charger portion is configured to wirelessly charge a peripheral device;
   wherein the first dipole magnet is configured to, based on the peripheral device being in a first orientation, attract the peripheral device toward the charging tray and locate a charging circuit of the peripheral device within a charging distance of the first charging circuit; and
   wherein the first dipole magnet is further configured to, based on the peripheral device being in a second orientation, cause the peripheral device to rotate toward the first orientation.

2. The computing device of claim 1, wherein the first charging circuit is configured so that when the peripheral device is in the first orientation, a first side of the peripheral device faces a bottom of the charging tray so that the charging circuit of the peripheral device is located within the charging distance of the first charging circuit; and
   wherein the first charging circuit is configured so that when the peripheral device is in the second orientation, a second side of the peripheral device faces the bottom of the charging tray and the first side does not face the bottom of the charging tray so that the charging circuit of the peripheral device is spaced greater than the charging distance from the first charging circuit.

3. The computing device of claim 1, wherein the first dipole magnet is configured to, based on the peripheral device being in the second orientation, cause the peripheral device to rotate toward the first orientation in conjunction with gravitational force pulling the peripheral device into the charging tray.

4. The computing device of claim 1, wherein the first housing supports a keyboard, and wherein the second housing supports a display.

5. The computing device of claim 1, wherein the first dipole magnet is configured to, based on the peripheral device being in the first orientation, cause the peripheral device to move laterally to align the first charging circuit with the charging circuit of the peripheral device.

6. The computing device of claim 1, wherein the first charging circuit comprises a first charging coil, and wherein the first charging coil is configured to inductively couple with a charging coil of the charging circuit of the peripheral device as a result of a peripheral device housing of the peripheral device being within the charging distance.

7. The computing device of claim 1, wherein the charger portion includes a plurality of first dipole magnets spaced from each other.

8. The computing device of claim 7, wherein the charging tray is elongate and defines a longitudinal axis LT;
   wherein the plurality of first dipole magnets are spaced equidistant from a central normal axis C1 of the charging tray; and
   wherein the central normal axis C1 is an axis that is oriented perpendicular to the longitudinal axis LT of the charging tray and substantially normal to a bottom of the charging tray at a location equidistant from ends of the charging tray.

9. The computing device of claim 7, wherein the charging tray is elongate and defines a longitudinal axis LT;
  wherein the plurality of first dipole magnets are spaced from a central normal axis C1 of the charging tray by a distance in a range between about 10.0 mm and about 30.0 mm; and
  wherein the central normal axis C1 is an axis that is oriented perpendicular to the longitudinal axis LT of the charging tray and substantially normal to a bottom of the charging tray at a location equidistant from ends of the charging tray.

10. The computing device of claim 1, wherein the charging tray is elongate and defines a longitudinal axis LT, wherein at least one end surface of the charging tray defines a surface angle θ that is in a range between about 5° and about 10°;
  wherein the surface angle θ is measured in a plane defined by a longitudinal axis LT and a central normal axis C1 of the charging tray; and
  wherein the central normal axis C1 is an axis that is oriented perpendicular to the longitudinal axis LT of the charging tray and substantially normal to a bottom of the charging tray at a location equidistant from ends of the charging tray.

11. The computing device of claim 1, wherein the hinge assembly includes at least one rigid zone interposed between flexible zones;
  wherein the hinge assembly includes a fabric covering; and
  wherein the charging tray is disposed in the rigid zone under the fabric covering.

12. A peripheral device, comprising
  an elongate housing;
  at least one dipole magnet located within the housing;
  a charging coil configured to generate current when inductively coupled to a charger portion of a charging system, wherein the charging coil is located within the housing;
  a charging controller located within the housing, wherein the charging controller is electrically coupled to the charging coil and configured to at least one of regulate or condition the current; and
  a rechargeable battery located within the housing and electrically coupled to the charging coil and the charging controller.

13. The peripheral device of claim 12, wherein the peripheral device comprises a plurality of dipole magnets;
  wherein the housing defines a central radial axis C2 that extends substantially radially through the outer wall of the housing and substantially parallel to a magnetic field vector of the at least one dipole magnet;
  wherein the central radial axis C2 extends through a portion of the charging coil; and
  wherein the plurality of dipole magnets are spaced equidistant from the central radial axis C2.

14. The peripheral device of claim 12, wherein the housing has an oblong cross-sectional shape that defines a plurality of stable abutment regions.

15. The peripheral device of claim 12, wherein the peripheral device is a stylus and the housing defines a tip end and a butt end.

16. The peripheral device of claim 12, wherein the peripheral device comprises a plurality of dipole magnets; and
  wherein each of the plurality of dipole magnets is positioned laterally biased relative to a longitudinal axis LS of the housing.

17. The peripheral device of claim 12, wherein the at least one dipole magnet is configured to interact with one or more magnets of the charger portion to locate the charging coil of the peripheral device within a charging distance of a charging coil of the charger portion of the charging system.

18. The peripheral device of claim 17, wherein the at least one dipole magnet is configured such that the interaction causes the peripheral device to rotate around a longitudinal axis LS of the housing to bring the charging coil of the peripheral device closer to the charging coil of the charger portion of the charging system.

19. The peripheral device of claim 17, wherein the interaction causes the peripheral device to move laterally in the direction along a radial axis to bring the charging coil of the peripheral device closer to the charging coil of the charger portion of the charging system.

20. The peripheral device of claim 12, further comprising an indicator configured to notify a user when the peripheral device is charging.

* * * * *